United States Patent
Howard

(10) Patent No.: US 10,091,361 B1
(45) Date of Patent: Oct. 2, 2018

(54) QUEUEING COMMUNICATIONS FOR A CONTACT CENTER

(71) Applicant: Noble Systems Corporation, Atlanta, GA (US)

(72) Inventor: Michael L. Howard, Austin, TX (US)

(73) Assignee: Noble Systems Corporation, Atlanta, GA (US)

(*) Notice: Subject to any disclaimer, the term of this patent is extended or adjusted under 35 U.S.C. 154(b) by 0 days.

(21) Appl. No.: 15/875,288

(22) Filed: Jan. 19, 2018

(51) Int. Cl.
    *H04M 3/00* (2006.01)
    *H04M 3/523* (2006.01)
    *H04M 3/51* (2006.01)

(52) U.S. Cl.
    CPC ........ *H04M 3/5232* (2013.01); *H04M 3/5183* (2013.01)

(58) Field of Classification Search
    CPC .. H04M 3/5175; H04M 3/5191; H04M 3/523; H04M 3/5233; H04M 3/5232; H04M 3/5235; H04M 3/5183; H04M 3/5166
    USPC ............. 379/265.01–265.06, 265.11–265.13, 379/266.01–266.05
    See application file for complete search history.

(56) References Cited

U.S. PATENT DOCUMENTS

| | | | |
|---|---|---|---|
| 5,754,639 A | 5/1998 | Flockhart et al. | |
| 6,088,444 A | 7/2000 | Walker et al. | |
| 6,493,695 B1 | 12/2002 | Pickering et al. | |
| 6,535,601 B1 | 3/2003 | Flockhart et al. | |
| 6,859,529 B2 | 2/2005 | Duncan et al. | |
| 7,110,525 B1 | 9/2006 | Heller et al. | |
| 7,158,628 B2 | 1/2007 | McConnell et al. | |
| 7,269,253 B1 | 9/2007 | Wu et al. | |
| 8,000,989 B1 | 8/2011 | Kiefhaber et al. | |
| 8,472,611 B2 | 6/2013 | Chishti | |
| 8,781,100 B2 | 7/2014 | Spottiswoode et al. | |
| 8,903,079 B2 | 12/2014 | Xie et al. | |
| 9,712,679 B2 | 7/2017 | Chrishti et al. | |
| 2004/0103017 A1 | 5/2004 | Reed et al. | |
| 2009/0190747 A1 | 7/2009 | Spottiswoode | |

(Continued)

OTHER PUBLICATIONS

Ten of the Best Ways to Efficiently Manage Inbound Calls in your Call Center, Danny Cresswell, Contact Center Management, Syntext Blog, Telecoms, Nov. 2, 2014.

(Continued)

*Primary Examiner* — Rasha Al Aubaidi

(57) ABSTRACT

Various embodiments of the invention provide methods, systems, and computer program products for routing a communication in a contact center. Specifically, a treatment is selected for a communication from a plurality of treatments supported by the contact center. Here, each treatment includes a set of sub-queues and is applicable to a reason and/or opportunity for conducting a communication with a party. Each sub-queue includes a value range and a plurality of agents assigned to handle communications placed in the sub-queue. Accordingly, in particular embodiments, a communication value is determined for the communication based on a computation specific to the selected treatment and a sub-queue is selected from the set of sub-queues based on the communication value falling within the value range for the sub-queue. The communication is then placed in the selected sub-queue so that it can be connected to an agent assigned to handle communications placed in the sub-queue.

21 Claims, 16 Drawing Sheets

(56) References Cited

U.S. PATENT DOCUMENTS

2014/0249873 A1     9/2014   Stephan et al.

OTHER PUBLICATIONS

Queueing Models for Call Centres, Mag. DI Dr. Christian Dombacher (9125296) Nikolaus Lenaugasse 8 A-2232 Deutsch-Wagram, May 13, 2010.
Resource Pools within Resource Pools, https://www.simul8.com/support/help/doku.php?id=features:pool_within_pool, Aug. 17, 2017.

QUEUEING COMMUNICATIONS FOR A CONTACT CENTER

BACKGROUND

Many contact centers generally address three questions with respect to handling inbound and/or outbound communications, such as telephone calls, short messaging service ("SMS") messages, multimedia messaging service ("MMS") messages, Web chats, emails, etc., with remote parties. The first of these questions is what are the best treatments to institute for handling the communications? A treatment is considered a process used to conduct a particular communication. For example, a contact center may define a treatment that involves having telephone calls from remote parties who primarily speak Spanish handled by agents working for the contact center who also primarily speak Spanish.

In many instances, a contact center's objective is to route each communication to a particular treatment that results in maximizing the benefit of the communication to the contact center and/or business for whom the contact center is handling the communication. Typically, a contact center applies some set of criteria and/or associated business rules to select the best treatment for a particular communication. This can be as simple as routing a communication to an agent who speaks the same language as the remote party involved with the communication or as complex as making the use of predictive models in a variety of ways.

Thus, many contact centers are routinely faced with determining what treatments to support and what logic to use to determine which treatment to apply to each communication. The answer to these two inquires varies based on the nature of the business, its products and/or services, and its client/prospect service philosophy.

The second question many contact centers consider with respect to handling communications is how should queues used for holding communications waiting to be serviced be structured and managed to attempt to derive optimal gain for the contact center and/or business? Generally speaking, once a family of treatments is established, some approach to structuring and managing the queues for the different treatments must also be established. For instance, one approach is to have a separate pool of agents dedicated to serving each treatment queue. While another approach is to have a single pool of agents that collectively handles all treatment queues, in effect creating a single queue combining all treatments.

However, the first approach is typically too restrictive in terms of dealing with intermittent phenomena such as agent idle time and random or deterministic call arrival rate surges. While the second approach can reduce the total number of agents needed to service the totality of treatment queues, but tends to degrade quality and effectiveness of service for all treatments. In some instances, a contact center may institute a compromise between the two approaches to attempt to capture the strong points of both. For example, one method is to give each agent a primary assignment to handle only calls for a specific treatment, but allows agents who are trained to handle more than one treatment to divert from their primary assignment under special circumstances such as when they become idle or when other treatment queues have temporary surges in demand.

Finally, the third question many contact centers consider with respect to handling communications is how should agent staff be trained and assigned to individual queues to support chosen business goals while minimizing cost? Therefore, some systematic process is needed for hiring and training agents, and that process needs to support the selected family of treatments and the chosen approach to queue management. Due to agent attrition and changes in overall communication volumes, it is generally necessary to hire, train, and lay off agents on an ongoing basis, while striving to retain and further develop highly productive members of the staff. After preliminary steps such as formal courses and shadowing of experienced agents, training has to transition to actual handling of communications. Ideally there would be some process for routing more routine communications, or communications that are deemed of less importance, to agents who are in training or who are less experienced. Another important goal is to reduce overall staff levels without significant degradation of response times or service quality, at least for parties who contribute materially to the stability and/or growth of the business.

Therefore, a need in the art exists that would facilitate contact centers in better addressing questions two and three once the contact centers have decided on which treatments to support has been defined. It is with respect to these considerations and others that the disclosure herein is presented.

SUMMARY

Various embodiments of the invention provide computer program products, methods, systems, apparatus, and computing entities for routing a communication in a contact center. Specifically, a treatment is selected for a communication from a plurality of treatments supported by the contact center. Generally speaking, each treatment is applicable to a reason and/or an opportunity for conducting a communication with a remote party. In addition, each treatment includes a set of sub-queues. Here, each sub-queue includes a value range and a plurality of agents assigned to handle communications placed in the sub-queue.

Accordingly, in particular embodiments, a communication value is determined for the communication based on a computation that is specific to the selected treatment and a sub-queue is selected from the set of sub-queues for the selected treatment based on the communication value falling within the value range for the sub-queue. At this point, the communication is placed in the selected sub-queue so that the communication can be connected to an agent assigned to handle communications placed in the sub-queue. As a result, the communication is then connected to an agent assigned to the sub-queue upon the agent becoming available to handle the communication.

Depending on the embodiment, the value range for each sub-queue for a particular treatment may be sequentially positioned to the value range for another sub-queue for the particular treatment. In addition, the value range for each sub-queue for a particular treatment may be based on an empirical communication value distribution derived from communication values for a set of communications that was applied the particular treatment and a percentage of communication volume to be handled by the sub-queue. In particular instances, the set of communications may be updated by replacing an oldest communication found in the set of communications with a new communication that was applied the particular treatment upon the new communication being applied the particular treatment.

Furthermore, in particular embodiments, at least one of the sub-queues for a particular treatment may include a service level requirement identifying a level of service that is to be maintained by the plurality of agents assigned to handle communications placed in the sub-queue. For example, the service level requirement may identify a number or a percentage of communications that remain in the sub-queue for the particular treatment before being connected to an agent for no longer than a pre-defined length of time. Here, the service level requirement may be used in these particular embodiments along with feedback stability requirements in making a determination of the number of agents to assign to handle communications placed in the sub-queue for the particular treatment. At that point, a ranking of each agent with respect to the particular treatment can be used to assign particular agents to the sub-queue.

Finally, in various embodiments, the set of sub-queues, the value range for each sub-queue, and/or the plurality of agents assigned to handle communications placed in each sub-queue may be periodically re-established for a treatment. Depending on the embodiment, such a re-establishment of these parameters may be performed for a treatment at the beginning of a workday to initialize the parameters for the treatment and/or in response to a change in a current condition of the contact center that affects the performance of the treatment.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein.

DETAILED DESCRIPTION

Figure 1:
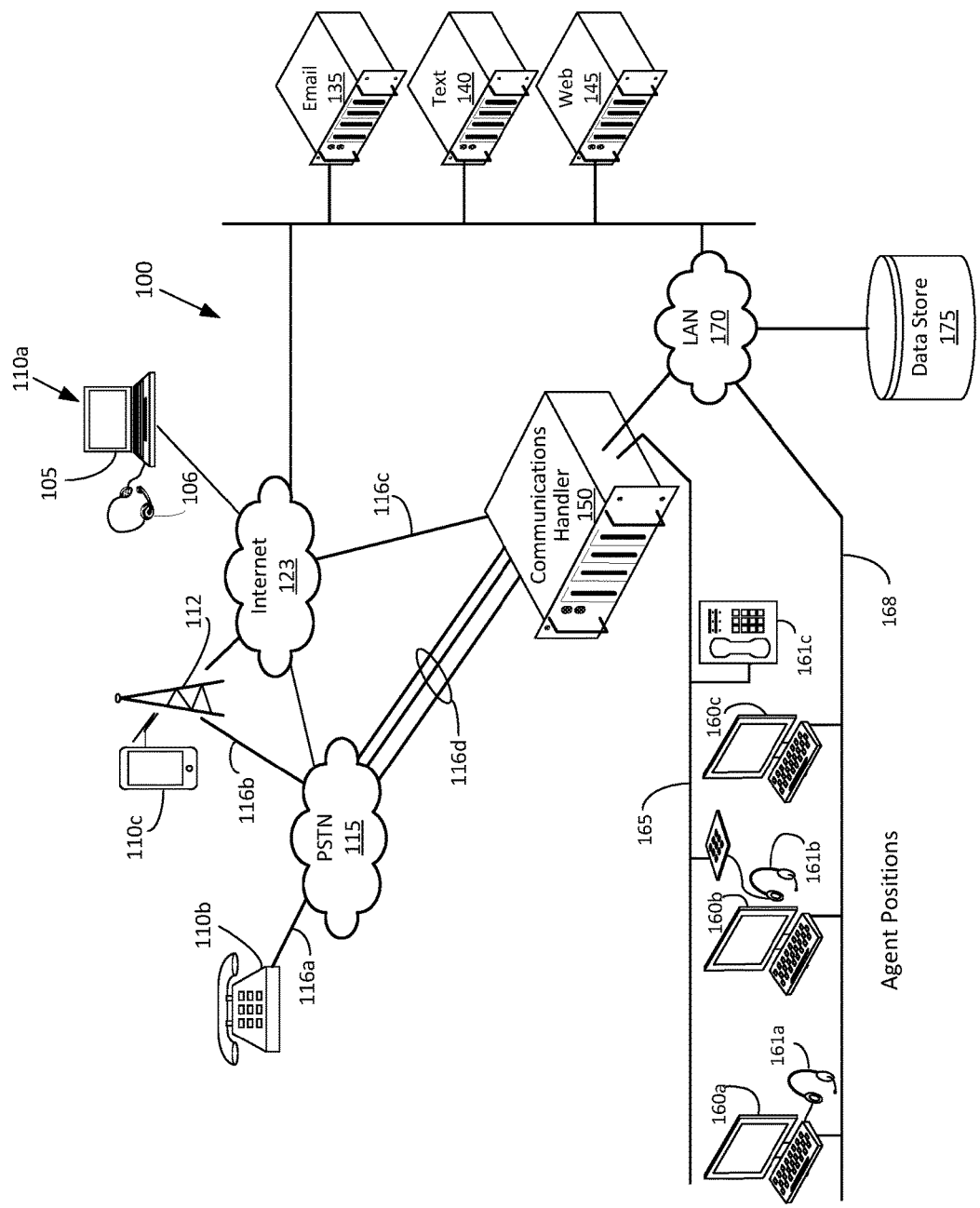
FIG. 1 illustrates an architecture of various components of a contact center that may be used in accordance with various embodiments of the present invention.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Contact Center Variables

Some variables related to a contact center environment are presented here to help facilitate the discussion of various embodiments of the claimed invention.

Communication Arrival Rate

Communication arrival rate is the average rate (e.g., communications per second) at which new communications show up at the contact center. The phrase "show up" is used to identify inbound communications that are received by the contact center and outbound communications originated by the contact center. The communication arrival rate for communications assigned to a specific treatment is of primary interest in various embodiments, and that rate will be lower than the communication arrival rate for the entire contact center.

Communication Value

Communication value is a number assigned to each communication routed to a given treatment that defines the expected payback from applying that treatment to a given communication. In various embodiments, the computation of communication value depends on the treatment chosen, and is based on logic that may make use of one or more predictive models. That is to say, in various embodiments, the computation of such values is normally different for different treatments. Furthermore, communication values in various embodiments allow communications within the same treatment to be compared based on their expected payback.

Particular embodiments, as described herein, make use of a lost value rate and a value capture rate. In these particular embodiments, for the lost value rate and the value capture rate to be meaningful, it is necessary for the communication value to be on a linear scale for which, if one call has a higher call value than another, then the call with the higher call value is indeed more valuable than the other call. Ideally if communication A is considered twice as valuable as communication B then the communication value of A should be twice as big as the communication value of B, but that is not essential. Accordingly, a pure ranking scale, such as a scale in which call values are letters of the alphabet instead of numbers, does not typically satisfy the linear numeric scale requirement. In addition, a logarithm scale may tend to distort the effect of a call value when computing the lost value rate and the value capture rate and therefore is typically avoided.

Abandonment Rate

For a set of communications, the abandonment rate is the ratio of the number of communications that expired (e.g., calls that hung up) before being connected to an agent, to the number of communications in the set. Of primary interest in particular embodiments is the abandonment rate for a set of communications routed to a particular treatment during some time window (an hour, a day, and so on) in that the abandonment rate can serve as a significant factor for the effectiveness of the treatment.

Lost Value Rate

When a communication placed in a treatment abandons then the value of that communication is lost. A useful variant on abandonment rate is the lost value rate: the ratio of the sum of the values of the abandoned communications to the sum of the values of all the communications routed to the treatment. Like abandonment rate, the lost value rate is normally computed for some time window of the communications routed to the treatment. Ideally this rate will be zero, but that is unrealistic. Various embodiments of the invention focus on minimizing lost value rate.

Value Capture Rate

Another variable related to communication value is value capture rate. For all the communications routed to a chosen treatment in some selected time interval, the value capture rate is the ratio of the sum of communication values of all those communications that were connected to an agent, to the sum of the values of all of the communications routed to the treatment. Various embodiments of the invention focus on maximizing value capture rate. Note that the effect of abandonment rate is implicit in the definition of value capture rate, since the values of abandoned communications are lost (not included in the numerator), but the values of the abandoned communications are counted in the sum of the values for all the communications routed to the treatment (the denominator). The value capture rate is maximized if there are no abandoned communications, but again that is unrealistic. In addition, maximizing the value capture rate is equivalent to minimizing the lost value rate, since the value capture rate and the lost value rate sum to one.

Agent Ranking

A fundamental aspect in various embodiments of the invention is agent ranking. In these particular embodiments, each agent assigned to a given treatment is given a ranking value. These ranking values may have a variety of forms such as, for example, positive integers or real numbers. In many instances, the nature of the scale used for agent ranking is not important, since all that is needed is a means to place each agent for a given treatment in a ranking position. In addition, the assignment of a ranking value to an agent in particular embodiments is based on some measure of agent performance such as, for example, the ratio of the number of successfully handled communications to total minutes the agent was engaged in the communications. Other factors such as level of experience or customer satisfaction rating may also be employed.

Agent Availability Rate

Finally, a variable used in various embodiments is agent availability rate, which for a given treatment is the rate at which agents become available to handle communications. This is somewhat similar to communication arrival rate, and is in effect an agent arrival rate. In many instances, the "arrival" of an agent to handle a communication is a random event, just as the arrival of a communication can be a random event.

Exemplary Contact Center Architecture

FIG. 1 illustrates a contact center architecture 100 that may be used in accordance with the various technologies and concepts disclosed herein. The contact center architecture 100 shown in FIG. 1 may process voice communications and non-voice communications that are inbound-only, outbound-only, or a combination of both (sometimes referred to as a "blended" contact center). Therefore, although many aspects of contact center operation may be disclosed in the context of voice calls, the contact center may process other forms of communication such as, for example, facsimiles, emails, text messages (SMS and/or MMS), video chats/calls, and Web chats.

Since the contact center may handle communications originating from a party, or initiated to a party, the term "party," "user," or "customer" without any further qualification, refers to a remote person associated with a communication processed by the contact center, where the communication is either received from or placed to the party. Thus, use of these terms is not intended to limit the concepts described in this application.

Accordingly, inbound voice calls can originate from calling parties using a variety of different phone types. For instance, a calling party may originate a call from a conventional analog telephone 110b connected to a public switched telephone network ("PSTN") 115 using an analog plain old telephone service ("POTS") line 116a. The calls may be routed by the PSTN 115 and may comprise various types of facilities 116d, including, but not limited to: T1 trunks, SONET based fiber optic networks, ATM networks, etc. Various types of routers, switches, bridges, gateways, and other types of equipment may be involved in the processing of the calls.

Inbound voice calls may also originate from a mobile phone device 110c, such as a smart phone, tablet, or other mobile device, which wirelessly communicates with a mobile service provider ("MSP") 112. The voice calls may be routed to the PSTN 115 using an integrated services digital network ("ISDN") interface 116b or other types of interfaces that are well known to those skilled in the art. In particular embodiments, the MSP 112 may also route calls as packetized voice, referred to herein as voice-over-IP ("VoIP") to an Internet provider 123 using Internet-based protocols, such as SIP or H.323 protocols. For convenience, unless indicated otherwise, the term "trunk" refers to any type of facility 116c, 116d providing voice calls to, or from, the contact center, regardless of the type of protocol or technology used. Specifically, a "trunk" is not limited to time-division multiplexing ("TDM") technology, but could refer to various VoIP communication channels.

Inbound voice calls may also originate from a calling party employing a so-called "IP phone," "VoIP phone," or "soft phone" 110a. In particular embodiments, this device may comprise a computing device 105, such as a laptop, computing tablet, or other electronic device, which interfaces with a headphone/microphone combination, also referred to as a "headset" 106. An IP phone may use a digital voice control protocol and may process packetized voice data according to various Internet based voice protocols, such as session initiated protocol ("SIP") and the call may be conveyed by an Internet provider 123. Those skilled in the art will recognize that a variety of Internet Protocols ("IP") and facilities may be used to convey voice calls.

The term "voice call" may encompass a voice call using any form of currently available technology and/or originating from any type of device, such as a soft phone 110a, a conventional telephone 110b, a mobile phone 110c, or other device known in the art. The term "call" as used herein may encompass an active instance of two-way communication, an attempt to establish two-way communication, or a portion of the two-way communication. For example, a user at a conventional telephone 110b can dial a voice call in an attempt to establish two-way communication, and a call can be said to exist even prior to establishment of the two-way connection.

In various embodiments, inbound voice calls from calling parties to the contact center may be received at a communications handler 150, which could be, for instance, an automatic call distributor ("ACD"). In particular embodiments, the communications handler 150 may be a specialized switch for receiving and routing inbound calls under various conditions. Further, the communications handler 150 may be embodied as a dedicated form of equipment readily available from various manufacturers, or the communications handler 150 may be a so-called "soft switch" comprising a suitable programming module executed by a processing device to perform the necessary specialized functions. The communications handler 150 may route an incoming call over contact center facilities 165 to a phone device used by an available agent for servicing. Depending on the embodiment, the facilities 165 may be any suitable technology for conveying the call, including but not limited to a local area network ("LAN"), wide area network ("WAN"), ISDN, or conventional TDM circuits. In addition, the facilities 165 may be the same or different from the facilities used to transport the call to the communications handler 150.

The physical area at which the agent sits is often referred to as an agent "position" and these positions are often grouped into clusters managed by a supervisor, who may monitor calls and the agents' productivity. An agent typically uses a specially configured computing device 160a-160c, such as a computer with a display, and a voice device 161a-161c that is adapted for various contact center functions associated with processing communications. For instance, the voice device 161a-161c may be a soft phone device exemplified by a headset 161a connected to the computer 160a. Here, the soft phone device may be a virtual telephone implemented in part by an application program executing on the computer 160a. Further, the phone may also comprise an Internet Protocol ("IP") based headset 161b or a conventional phone 161c. Use of the term "phone" is intended to encompass all these types of voice devices used by an agent, unless indicated otherwise.

The combination of computing device 160a-160c and voice device 161a-161c may be referred to as a "workstation." Thus, for these particular embodiments, the workstation collectively has a data capability and a voice capability, although separate devices may be used. Here, data may be provided to an agent's workstation computer 160a-160c over facilities 168 along with routing the call to the agent's workstation voice device 161a-161c over other facilities 165. In some instances, "workstation" may be used in reference to either the data or voice capability at the agent's position. For example, "routing the call to the agent's workstation" means routing a call to one of the voice devices 161a-161c at the agent's position. Similarly, "routing the call to the agent" means routing a call to the appropriate equipment at an agent's position. The workstation typically has a display, provided via a computer monitor. This is used to convey information to the agent about the calls, and the agent may interact with the communications handler 150 using a mouse or other pointing device in conjunction with their computer display.

Depending on the embodiment, the agent positions may be co-located in a single physical contact center or multiple physical contact centers. The agents may be remotely located from the other components of the contact center, and may also be remotely located from each other, sometimes referred to as a "virtual contact center." In particular instances, a virtual contact center may describe a scenario in which agents work at home, using their own computers and telephones as workstations. In some configurations, a single physical location of the contact center may not be readily identifiable. For instance, this may occur when the call processing functions are provided as a service in a hosted cloud computing environment and the agents positions are in their individual residences. It is even possible for the supervisor to be remotely located (e.g., work at home), and such an arrangement does not negate the existence of the contact center.

Agents typically log onto their workstations prior to handling calls. The workstation may also communicate this login information to the communications handler 150 to allow the contact center (including the communications handler 150) to know which agents are available for handling calls. In particular embodiments, the communications handler 150 may also maintain data on an agent's skill level that may be used to route a specific call to the agent or group of agents having the same skill level. The communications handler 150 may also know what types of channels and combinations of channels the agent can handle.

Accordingly, in various embodiments, the communications handler 150 may place a call in a queue if there are no suitable agents available to handle the call, and/or the handler 150 may route the call to an interactive voice response system (e.g., server) ("IVR") (not shown) to play voice prompts. In particular embodiments, these prompts may be defined to be in a menu type structure and the IVR may collect and analyze responses from the party in the form of dual-tone multiple frequency ("DMTF") tones and/or speech. In addition, the IVR may be used to further identify the purpose of the call, such as, for example, prompting the party to enter account information or otherwise obtain information used to service the call. Further, in particular embodiments, the IVR may interact with other components such as, for example, a data store 175 to retrieve or provide information for processing the call. In other configurations, the IVR may be used to only provide announcements.

As noted, the contact center may also receive non-voice communications such as, for example, text messages, emails, and chats. For instance, text messages may be sent by parties using smart phones 110c over a MSP 112 and the Internet 123 and are received by a text gateway server 140. These text messages may be SMS text messages and/or MMS text messages. Once received, the text gateway server 140 in particular embodiments may inform the communications handler 150 of the text messages and the handler 150 may then queue up the text messages for appropriate agents.

In other embodiments, the contact center may make use of one or more components separate from the handler 150, such as a communications router (not shown in FIG. 1) that instead handles the routing of various communications to agents. For instance, in these particular embodiments, the text gateway server 140 may instead inform a communications router of the text messages and the router may then queue up the text messages for appropriate agents. Similarly, the communications handler 150 may also inform the communications router of various calls so that the router can then queue up the calls for appropriate agents. However, with that said, the remainder of the specification makes reference to a communications handler 150 to carry out such functionality, although it should be understood that portions of the communications handler's 150 functionality may be performed by one or more other components within the contact center architecture 100.

Similarly, emails may be sent by users over the Internet 123 to an email server 135, and the email server 135 may inform the communications handler 150 of the emails so that the communications handler 150 can queue up the emails for appropriate agents. With respect to chats, in various embodiments a party can request a chat by accessing a website (e.g., one or more webpages) via a Web server 145. In turn, the Web server 145 informs the communications handler 150 of the chat and the handler 150 queues the appropriate agent to handle the chat.

Depending on the embodiment, the interactions between the various components shown may involve using a local area network ("LAN") 170. However, other configurations are possible, such as, but not limited to, using a wide area network, wireless network, router, bridge, direct point-to-point links, etc. Furthermore, in lieu of using facilities 165 directly linked to the communications handler 150 for conveying audio to the agents, other facilities 168 associated with the LAN 170 may be used.

In addition to receiving inbound communications, the contact center may also originate communications to parties, referred to herein as "outbound" communications. For instance, in particular embodiments, the communications handler 150 may be a dialer, such as a predictive dialer, that originates outbound calls at a rate designed to meet various criteria. Here, the communications handler 150 may include functionality for originating calls, and if so, this functionality may be embodied as a private automatic branch exchange ("PBX" or "PABX"). In addition, the communications handler 150 may directly interface with voice trunks using facilities 116c, 116d to the PSTN 115 and/or Internet provider 123 for originating calls. After the calls are originated, the communications handler 150 may perform a transfer operation to connect the calls with agents, a queue, or an IVR. Furthermore, in various embodiments, the communications handler 150 may make use of one or more algorithms to determine how and when to dial a list of numbers so as to minimize the likelihood of a called party being placed in a queue while maintaining target agent utilization. In similar fashion, the email server 135, text gateway server 140, and the Web server 145 can be utilized in various embodiments to originate outbound emails, text messages, and chats with parties.

Finally, in various embodiments, the communications handler 150 determines which agent is authorized and available to handle a communication upon being made aware of a voice or non-voice communication, and thereafter appropriately coordinates any response to the communication. In addition, the communications handler 150 may also make use of one or more schemes in allocating communications to agents such as, for example, on a round-robin basis, a least-number-served basis, a first available agent basis, and/or a seniority basis.

Although a number of the above components are referred to as a "server," each may also be referred to in the art as a "computing device," "processing system," "unit," or "system." A server may incorporate a local data store and/or interface with an external data store. Use of the word "server" does not require the component to interact in a client-server arrangement with other components, although that may be the case. Further, the above components may be located remotely from (or co-located with) other components. Furthermore, one or more of the components may be implemented on a single processing device to perform the functions described herein. For example, in various embodiments, one or more functionalities of the communications handler 150 or other component may be combined into a single hardware platform executing one or more software modules. In addition, the contact center architecture 100 may be provided as a hosted solution, where the call processing functionality is provided as a communication service (a so-called "communication-as-a-service" or "CaaS") to a contact center operator. Thus, there is no requirement that the components identified above actually be located or controlled by a contact center operator. Those skilled in art will recognize FIG. 1 represents one possible configuration of a contact center architecture 100, and that variations are possible with respect to the protocols, facilities, components, technologies, and equipment used.

Exemplary System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

General Overview

Rather than using a single queue for a given treatment, various embodiments of the invention involve dividing the total communication arrival stream for a given treatment into two or more sub-queues that are defined by communication values falling within a specified range. One purpose of using sub-queues in particular embodiments is to create the means for providing lower wait times for higher value communications and higher wait times for lower value communications. This approach allows the best use of agent staff to be made in pursuing the business goal(s) of the chosen treatment.

Figure 2:
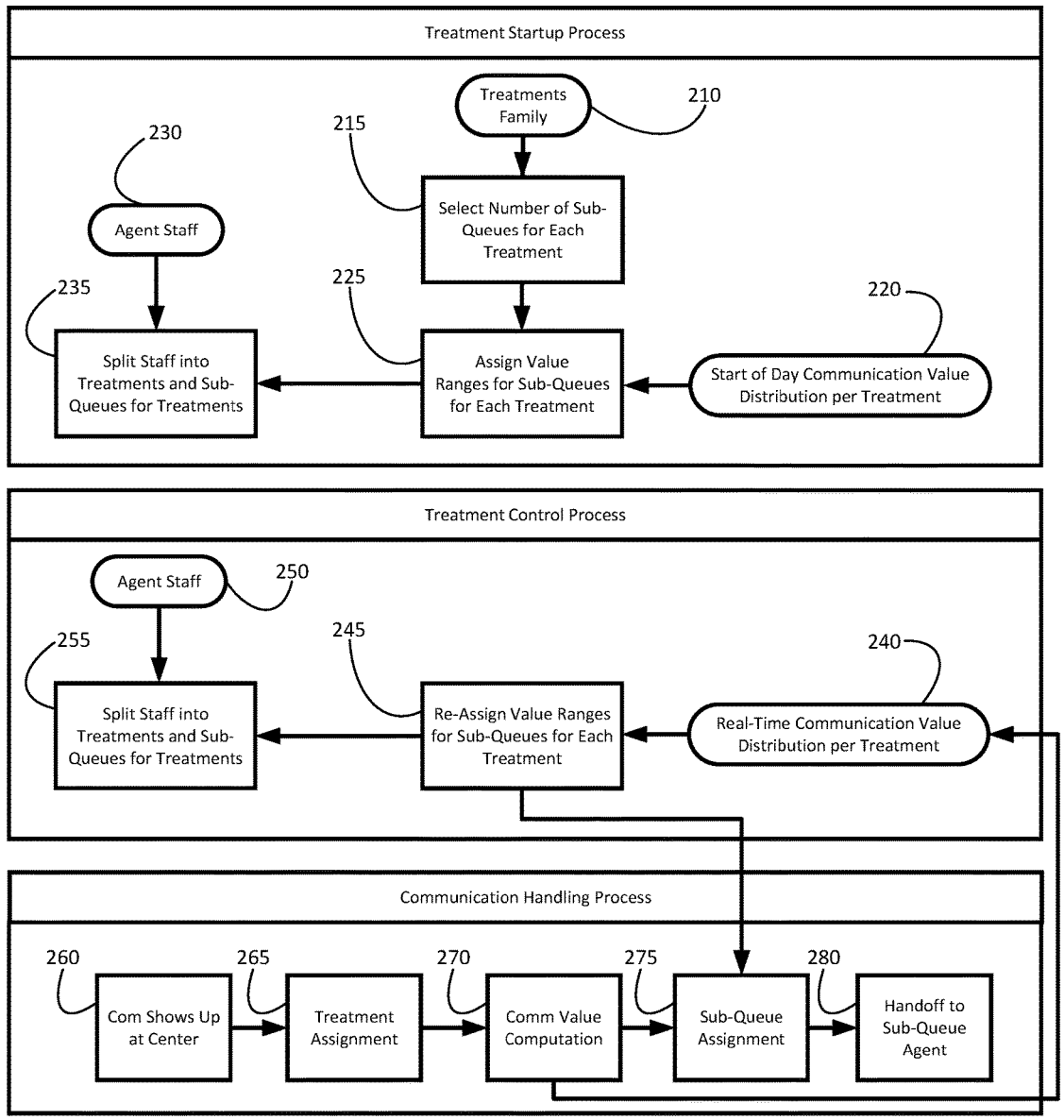
FIG. 2 illustrates an overview of several processes that are involved in various embodiments of the present invention.

Therefore, with this approach in mind, FIG. 2 provides a treatment startup process, a treatment control process, and a communication handling process according to various embodiments of the invention. Turning first to the treatment startup process, a contact center implements this approach in various embodiments by initially identifying a family of treatments that is to be supported by the contact center. Accordingly, this family of treatments may be applicable to several different reasons and/or opportunities for conducting a communication with a remote party depending on the circumstances and the types of communications handled by the contact center.

For example, the contact center may define a family of treatments that includes a first treatment for handling communications involving remote parties placing sales orders, a second treatment for handling communications involving remote parties returning a purchased product, a third treatment for handling communications involving remote parties needing technical support for a purchased product, and so forth. Furthermore, treatments may be defined with respect to other criteria such as skills needed by agents fielding the communications and/or the channels of communication being used for the communications. For example, the contact center may include a treatment in the family of treatments for handling inbound telephone calls from parties placing a sales order who primarily speak Spanish. Accordingly, any inbound calls applied this particular treatment would be routed to agents who are able to handle taking sales orders and who can speak Spanish. Those of ordinary skill in the art can envision multiple criteria and/or several different business rules (different logic) that can be used in defining a family of treatments in light of this disclosure.

Accordingly, the family of treatments serves as input 210 to the treatment startup process, which next involves selecting a number of sub-queues for each treatment in the family in Operation 215. For example, a contact center may define a retention treatment for the purpose of retaining loan accounts in an existing revolving loan account portfolio, such as a credit card or mortgage. This particular treatment is applied to inbound calls from customers who the contact center predicts will close their existing accounts in the near future. Here, the contact center would rather provide these customers with currently competitive conditions on a replacement account instead of passively allowing the customers to close their accounts. In this example, the contact center may decide to initially divide the treatment into three sub-queues based on low, middle, and high valued calls.

At this point, the contact center assigns initial value ranges for the sub-queues for each treatment in Operation 225. For instance, in particular embodiments, the contact center selects a recent history of communications at the beginning of a workday that were assigned to a particular treatment during a past time period (or would have been assigned to the particular treatment over the past time period) to provide a set of observations of communication values for the treatment. This set of observations of communication values is used to determine an empirical start of the day communication value distribution for the treatment that is then used as input 220 for assigning initial value ranges to the sub-queues for the treatment.

For instance, returning to the example involving the retention treatment for the purpose of retaining loan accounts in an existing revolving loan account portfolio, the contact center may select a recent history of calls to which this particular treatment was applied over a past workday. Here, the contact center computes a value for each call found in the history of calls by estimating the gross revenue expected over a time period if a new account offer is made and accepted, and then subtracting from the estimated gross revenue the business costs of account maintenance and support during the same time period. This approach provides an estimate of net revenue, which in turn can be modified by means of using a risk model to predict the risk associated with opening the new account. In addition, the contact center may also adjust the value based on the likelihood of the caller accepting the new offer.

Accordingly, if the range of call values for the calls found in the history of calls is from 0 to 1,000 and the contact center wants to have 5% of all calls in the high value range, 25% of all calls in the middle value range, and the remainder of calls in the low value range, then the contact center can use the start of the day call value distribution to determine two call value thresholds that will produce those percentages. That is to say, given any two call values, the start of the day call value distribution allows for the calculation of the percentage of all calls in the distribution that are between those two values.

Figure 3:
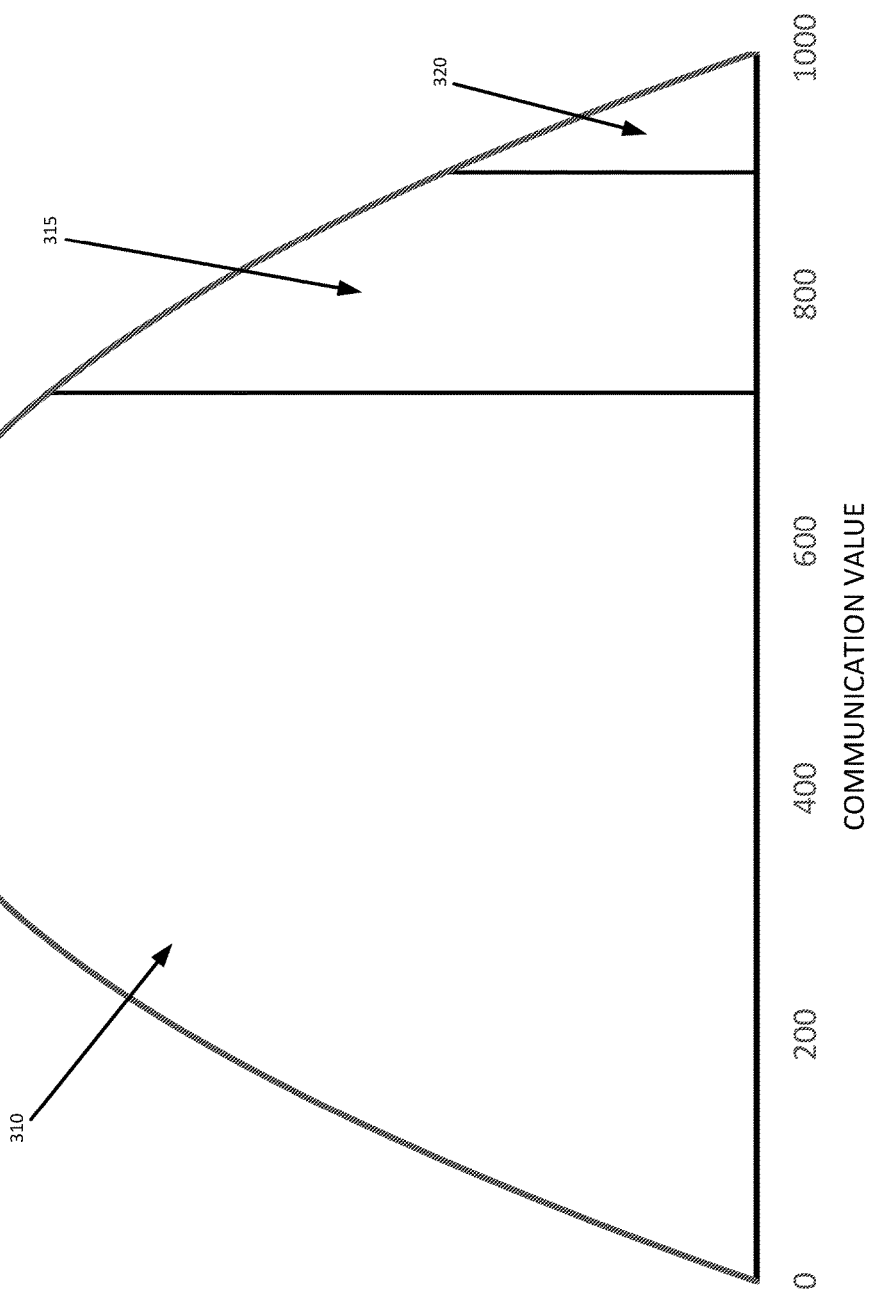
FIG. 3 illustrates a communication value distribution.

Here, in the example, those numbers turn out to be 700 and 900. Therefore, the range for the high value sub-queue is set to 900 and above, the range for the middle value sub-queue is set to 700 to 899, and the range for the low value sub-queue is set to 0 to 699. The ranges of call values assigned to the sub-queues for the retention treatment is illustrated in FIG. 3 for one of many possible shapes of the start of the day call value distribution. Specifically, FIG. 3 shows that 70% of the calls assigned to this treatment fall in the area 310 of the call value distribution that falls between 0 and 699, 25% of the calls assigned to this treatment fall in the area 315 of the call value distribution between 700 and 899, and 5% of the calls assigned to this treatment fall in the area 320 of the call value distribution between 900 and 1000.

Once the value ranges defining each sub-queue are assigned for each treatment, each sub-queue becomes an independently managed queue. Accordingly, a given treatment sub-queue only handles communications routed to that treatment which have communication values in the range assigned to that sub-queue.

The next step of the process is to assign agent staff to the family of treatments and more specifically, to the sub-queues for each of the treatments. Therefore, the process continues by using the agent staff as input 230 and splitting the staff into the treatments and sub-queues of the treatments accordingly in Operation 235.

As the reader may recall, each agent assigned to a particular treatment is given a ranking value to allow for the agent to be placed in a ranking position for the particular treatment. Therefore, the highest ranking agents assigned to a particular treatment are assigned to the highest value sub-queue found in the treatment, the highest ranking agents who remain are assigned to the next highest value sub-queue found in the treatment, and so forth.

Thus, a key question becomes how many highest ranking agents (who remain) are assigned to each sub-queue? The answer in various embodiments is the number of agents needed to support a service level requirement set for the sub-queue, with the notable exception of the lowest value sub-queue.

A service level requirement identifies a level of service that is to be maintained by the agents assigned to a sub-queue in handling the communications placed in the sub-queue. For example, the service level requirement may identify a number of communications (or a percentage of communications) that remain in the sub-queue before being connected to an agent to handle no longer than a pre-defined length of time (a wait time or an median wait time). The retention treatment example is again considered to demonstrate the process for determining the number of agents to assign to each sub-queue.

Beginning with the high value sub-queue (≥900), the data for the history of calls provides the basis for estimating the call arrival rate for calls in that range for the retention treatment. In addition, the data for the history of calls can also be used for estimating the agent availability rate in the high value range, as an increasing function of the number of agent assigned to that sub-queue. Since, in general, high value calls should be connected to highly qualified agents promptly (have a short wait time), the contact center may set a low amount of time for some standard waiting criterion (for the service level requirement), such as 95% of all calls wait for no more than 2 seconds before being connected with an agent. Thus, once the contact center has set the criterion, the center in various embodiments may then use a standard contact center sizing calculation method, such as Erlang C for example, based on the criterion and the estimated call arrival rate and estimated agent availability rate, to determine the number of agents required to meet the service level requirement of the high value sub-queue. Accordingly, that number of agents from the top of the ranking order for the treatment are then assigned to the high value sub-queue.

Next, the contact center may choose a less stringent service level requirement for the middle value sub-queue (for example, a wait time=3 seconds) and the procedure is repeated, choosing remaining agents who have not yet been unassigned to a sub-queue from the top of the ranking. The process changes in the final step in that the lowest value sub-queue is assigned all remaining agents left in the ranking, with no application of a service level requirement. Instead, in particular embodiments, the service level requirement calculation is reversed in that a wait time value is determined from the number of agents assigned to the lowest value sub-queue.

Therefore, returning to the example, the number of agents assigned to the high value, middle value, and low value sub-queues might be 30, 20, and 10 respectively, to handle 5%, 25%, and 70% of the treatment calls respectively. If the wait time criterion value back-calculated for the lowest value sub-queue indicates very low wait times then either the wait time criteria for the upper value sub-queues can be tightened or the number of agents assigned to the treatment can be reduced. At the other extreme, if the wait time criterion value back-calculated for the lowest value sub-queue indicates very long wait times then either the wait time criteria for all the other sub-queues may be overly stringent and can be loosened or the staff assigned to the treatment can be increased.

At the conclusion of this process, the initial division of the treatments into sub-queues and the initial assignment of the agent staff to the treatments and corresponding sub-queues have been made. At this point, the contact center may now begin to handle communications and processes such communications with respect to the defined family of treatments and corresponding sub-queues. In particular embodiments, the contact center does so by using the communication handling process shown in FIG. 2.

Thus, turning to this process, a communication shows up at the contact center in Operation 260. For instance, returning to the example involving the retention treatment, the contact center receives an inbound call from a remote party. The contact center then elects to apply a treatment found in the family of treatments to the communication in Operation 265. Here, the contact center may apply one or more sets of criteria and/or business rules to perform this operation. For instance, in the example, the contact center may apply one or more sets of criteria and/or business rules and come to a conclusion that the remote party who has placed the inbound call is a customer with a revolving loan account who the center concludes will close his existing account in the near future. Therefore, the contact center elects to apply the retention treatment to the inbound call in the hopes of retaining the customer with a replacement account.

At this point, the contact center computes a communication value (e.g., a call value) for the communication (e.g., for the inbound call) in Operation 270. In particular embodiments, the computation used by the contact center is specific with respect to the treatment being applied to the communication. Here, in the example, the contact center may determine a call value for a call being applied the retention treatment is based on an estimated gross revenue expected to be generated by opening a replacement account for the customer. For instance, the criteria and/or business rules applied by the contact center for this particular treatment may entail some type of predictive model that generates an estimate for the gross revenue on opening a replacement account for the customer.

Once the contact center has determined a value for the communication, the contact center assigns the communication to a sub-queue of the selected treatment based on the determined communication value in Operation 275. Accordingly, the communication is placed in the appropriate sub-queue and is finally fielded by an agent who has been assigned to that sub-queue. For instance, returning to the example, the contact center may determine the call being applied the retention treatment has a value of 930. That is to say, the contact center may determine the call is a high value call. Therefore, the contact center assigns the call to the high value sub-queue found in this treatment and as a result, the call is forwarded to a qualified agent who has been assigned to the high value sub-queue ideally within two seconds of the call being placed in this queue in Operation 280. That is to say, the call is forwarded and handled by an agent who ideally has a high ranking with respect to the retention treatment and therefore, who should be very qualified and capable of persuading the remote party to open a replacement account.

Generally speaking, the treatment startup process in various instances creates a static assignment of agents in a specific treatment to the sub-queues for the treatment, ignoring that conditions occur within the contact center that can affect the communication arrival rate and/or agent availability rate for the specific treatment and corresponding sub-queues from day to day and/or at various times within a single workday. Therefore, various embodiments of the invention involve continuously updating the value ranges for sub-queues and/or the actual assignment of agents to sub-queues (and in some instances the number of sub-queues, themselves, and/or the service level requirements applicable to the sub-queues) in a treatment based on current contact center conditions that affect the treatment. For example, when the overall communication arrival rate for a particular treatment has a temporary surge, the process may involve automatically modifying the value ranges set for the sub-queues and/or the sub-queue assignments for agents for the particular treatment to adjust the agent counts in all the sub-queues to help address the temporary surge for the treatment.

Therefore, returning to FIG. 2, a treatment control process is shown in which the values derived for communications assigned to the different treatments during the communication handling process are used to supplement the sample of communication values used to derive the communication value distribution for each treatment in real-time. As already discussed, a start of the day communication value distribution for a given treatment is used during startup in various embodiments to assign values to the sub-queues and to aid in initially assigning agents to the sub-queues for the treatment. However, as a workday progresses in particular embodiments, the start of the day communication value distribution is replaced by a real-time communication value distribution to serve as input 240 into re-assigning value ranges for the sub-queues found in a particular treatment in Operation 245 as well as re-assigning staff to the sub-queues in Operation 255 based on the available staff 250 at that time and in accordance with the updated sub-queues and corresponding ranges.

For instance, the treatment control process in particular embodiments may involve gradually replacing a start of the day communication value distribution for a treatment with a real-time communication value distribution derived from a moving window of time made up of the most recent communications to which the treatment was applied. For example, the number of communications to keep in the window of time may be fixed at 100, wherein the oldest communication is dropped from the window whenever a new communication is added. Accordingly, as the workday progresses, the start of day communication value distribution is gradually replaced with a real-time communication value distribution derived from the most recent 100 communications to which the treatment was applied as new communications are added to the window of time and old communications that were used in deriving the start of the day communication value distribution are dropped from the window of time. Furthermore, the real-time communication value distribution for the particular treatment is continuously updated as the treatment is applied to new communications during the workday, resulting in the most recent communications being added to the moving window of time and the oldest communications being dropped from the window of time. Thus, as a result, the contact center is able to account for current contact center conditions that can affect one or more treatments the contact center is making use of to handle communications by performing such a treatment control process in various embodiments.

Treatment Initialization Module

Figure 4:
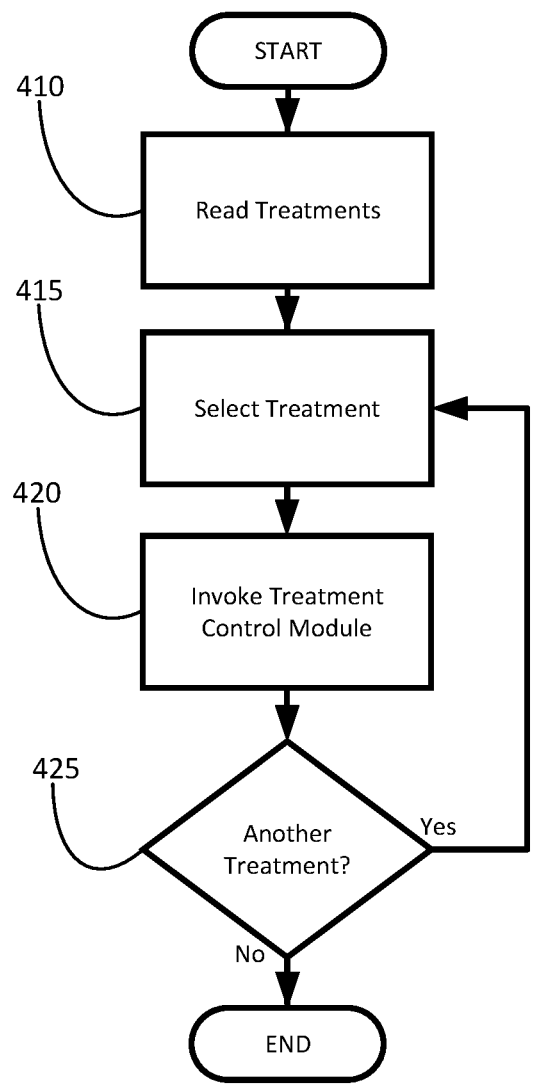
FIG. 4 illustrates a process flow for initializing the treatments for a contact center at startup in accordance with various embodiments of the present invention.

Turning now to FIG. 4, additional details are provided regarding a process flow for initializing the treatments for a contact center at startup (e.g., at the beginning of a workday) according to various embodiments of the invention. In particular, FIG. 4 is a flow diagram showing a treatment initialization module for performing such functionality according to various embodiments of the invention. For example, the flow diagram shown in FIG. 4 may correspond to operations carried out by one or more processors in one or more components, such as, for example, the communications handler 150 described above, as it executes the treatment initialization module stored in the component's volatile and/or nonvolatile memory.

Accordingly, a contact center may invoke the treatment initialization module in various embodiments at the start of a workday to initialize the treatments supported by the contact center so that initial value ranges and agents are assigned to the sub-queues of these treatments. Therefore, the process begins with the treatment initialization module reading the family of treatments supported by the contact center in Operation 410. Here, depending on the embodiment, the treatment initialization module may read the family of treatments from some type of storage media located within or outside of the contact center. In addition, the treatment initialization module may retrieve one or more pieces of information about each of the treatments such as, for example, the sub-queues defined for a treatment, the service level requirements set for these sub-queues, and/or the communication volume percentages set for these sub-queues.

Next, the treatment initialization module selects a particular treatment from the family of treatments in Operation 415. At this point, in particular embodiments, the treatment initialization module invokes a treatment control module in Operation 420 to initially assign the value ranges and agents to the sub-queues of the treatment. As discussed in more detail herein, the treatment control module assigns the value ranges and agents to the sub-queues of the treatment based on one or more parameters defined for the treatment (such as, for example, the number of sub-queues, the service level requirements for the sub-queues, and/or the percentages of communication volume to be handled by the sub-queues) and/or one or more conditions derived from a set of communications that includes communications that were processed using the treatment in the past (such as estimated communication arrival rate and/or estimated agent availability rate).

The treatment initialization module then determines whether another treatment is found in the family that needs to be initialized in Operation 425. If so, then the treatment initialization module returns to Operation 415 and selects the next treatment. If not, then the treatment initialization module simply ends the process. Accordingly, the contact center is now ready to begin processing communications by using the family of treatments as a result of initializing all of the treatments supported by the contact center.

Communication Handling Module

Figure 5:
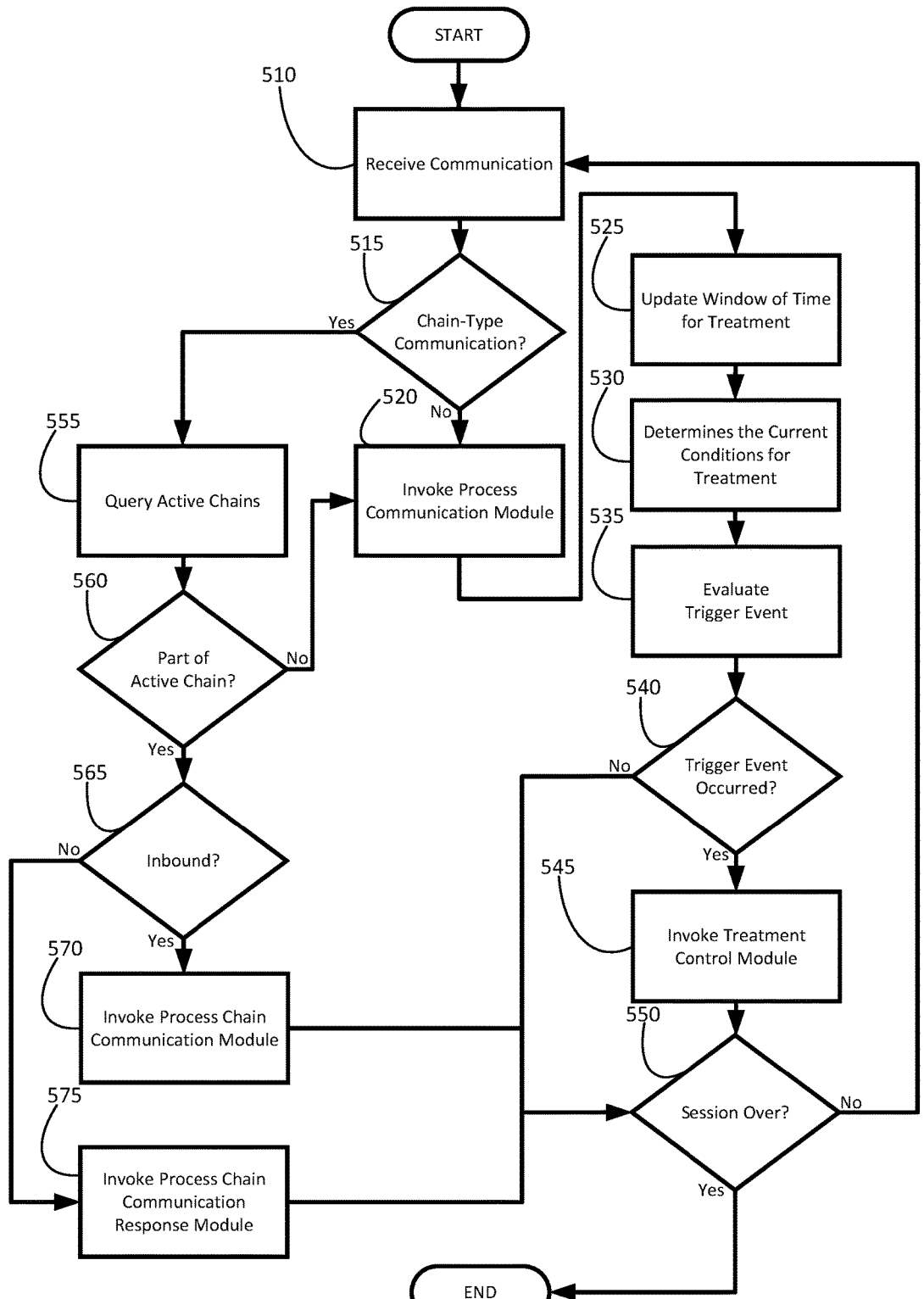
FIG. 5 illustrates a process flow for handling a communication that is received by a contact center in accordance with various embodiments of the present invention.

Turning now to FIG. 5, additional details are provided regarding a process flow for handling a communication that is received by a contact center according to various embodiments of the invention. A "received" communication is understood to be an inbound communication received by the contact center from a remote party or an outbound communication sent by the contact center to a remote party. In particular, FIG. 5 is a flow diagram showing a communication handling module for performing such functionality according to various embodiments of the invention. For example, the flow diagram shown in FIG. 5 may correspond to operations carried out by one or more processors in one or more components, such as, for example, the communications handler 150 described above, as it executes the communication handling module stored in the component's volatile and/or nonvolatile memory.

Some channels of communication involve a continuous exchange (interaction) between an agent and a remote party until the communication is terminated. For example, during a telephone call, an agent and a remote party typically engage in a continued conversation on the call while the call is taking place (unless the party is placed on hold) and do not stop conversing until the call is terminated. Similarly, during a Web chat, an agent and a remote party typically engage in a continued exchange of messages back and forth during the chat and do not stop communicating via the messages until the chat is terminated.

However, others channels of communication may allow for intermittent and sometimes lengthy delays during exchanges between an agent and a remote party. For example, an agent and a remote party may be engaged in exchanging a series of text messages or emails between themselves and the delay between any two particular exchanges or series of exchanges may be minutes or even hours. Here, a contact center may view such a series of exchanges between an agent and a remote party using one of these channels of communication as a chain of communication between the agent and the remote party that can take place over a variable period of time.

Therefore, with this in mind, the process shown in FIG. 5 begins with the communication handling module receiving a communication in Operation 510. In various embodiments, this operation entails the communication handling module being made aware of a communication that the contact center has received that needs to be routed to an agent of the contact center. For example, the received communication may be an outbound call placed by the contact center to a remote party who has answered the call. While in another instance, the received communication may be an inbound text message received by the contact center that needs to be replied to by an agent.

Once the communication handling module has received a communication, the communication handling module determines whether the communication is a "chain-type" communication in Operation 515. As mentioned above, a "chain-type" communication involves a channel of communication that allows for intermittent and sometimes lengthy delays during exchanges between an agent and a remote party such as, for example, an email or a text message.

If the communication handling module determines the communication is not a "chain-type" communication, then the communication handling module in various embodiments invokes a process communication module in Operation 520. As discussed in further detail herein, the process communication module is configured to select a treatment to apply to the communication, determine a value for the communication based on the selected treatment, and assign the communication to a sub-queue of the selected treatment based on the value. Once placed in a sub-queue, the communication stays in the sub-queue until the communication is forwarded to an agent to handle. For instance, the sub-queue may be constructed as a first-in-first-out configuration so that communications are routed to agents in the order in which they arrive in the sub-queue. Therefore, the communication is routed to an agent once the communication reaches the front of the queue. That is say, the communication is routed to an agent once the communication becomes the oldest one in the sub-queue and an agent who is servicing the sub-queue becomes available.

At this point, the communication handling module updates the window of time for the selected treatment in Operation 525. As previously discussed, the contact center makes use of a set of communications for a treatment to derive a communication value distribution for the treatment that is used in establishing the properties of the treatment such as the number of sub-queues that make up the treatment, the value ranges for the sub-queues, and/or the agent assigned to the sub-queues. In various embodiments, the contact center starts off with a start of day communication value distribution for a treatment that is derived from a set of historical communications whenever service for the treatment is first activated for a workday. Then the start of day communication value distribution is gradually replaced by a real-time communication value distribution that is updated based on the treatment's moving window of time. Therefore, in these particular embodiments, the window of time is fixed as some number of communications such as 100 or 1,000 for example, and the oldest communication is dropped from the window when a new communication is added. Therefore, in various embodiments, the communication handling module is the mechanism for adding communications to the moving window of time for the treatment.

Furthermore, as previously discussed, the current conditions for the contact center can affect the performance of the treatment. For example, the overall communication arrival rate for the treatment may experience a temporary surge that may affect how well one or more of the sub-queues for the treatment can handle the volume of communications assigned to them. Therefore, in various embodiments, the communication handling module checks to see whether any such conditions have changed for the contact center to the point that the performance of the treatment may be affected.

Accordingly, in Operation 530, the communication handling module determines the current conditions of the contact center in relation to the treatment. For example, the communication handling module may determine the current arrival rate for communications for the treatment and/or the sub-queues of the treatment. In addition, the communication handling module may determine the current agent availability rate for the treatment and/or the sub-queues of the treatment. Furthermore, the communication handling module may determine how well one or more of the sub-queues are adhering to their service level requirements and/or the average wait time for communications placed in the lowest value sub-queue. Here, the communication handling module evaluates the current conditions of the contact center in Operation 535 to determine whether a trigger event occurs indicating the properties of the treatment should be re-evaluated and modified if needed.

For instance, the contact center may define a trigger event as an instance in which the communication arrival rate increases by a certain percentage. While in another instance, the contact center may evaluate whether one or more of the sub-queues for the treatment are currently able to meet their service level requirements. For example, the contact center may define a threshold that each of the sub-queues must stay within with respect to their serve level requirement and a trigger event occurs when a particular sub-queue is performing outside that threshold. As for the lowest value sub-queue, the contact center may define a threshold median wait time for the sub-queue that indicates a trigger event when the median wait time for communications placed in the sub-queue becomes higher than the threshold median wait time. Depending on the embodiment, the contact center may define any number of different trigger events that identify instances where the properties of a treatment should be re-evaluated and modified if needed.

Therefore, the communication handling module determines whether a trigger event has occurred in Operation 540. If so, then the communication handling module in various embodiments invokes a treatment control module in Operation 545. As discussed further herein, the treatment control module is configured to evaluate the properties of a treatment and the contact center conditions that can affect the treatment and assign sub-queues, sub-queue value ranges, and/or the agents to sub-queues for the treatment based on the evaluation. Such real-time evaluation and modification of a treatment allows for the contact center in various embodiments to operate the treatment in a highly effective manner.

It is noted that in particular embodiments, a determination as to whether a trigger event has occurred is not necessarily checked for every single communication that is received but instead may be checked contingent upon other factors. For instance, in particular embodiments, a module may be configured to run as an independent asynchronous process from the communication handling module that checks for the occurrence of a trigger event without reference to the arrival of a specific communication. For example, such a module may be configured to monitor the treatments established for the contact center and detect a significant change in the current conditions for a particular treatment, such as a change in the number of agents assigned to the treatment that could qualify as a trigger event. Accordingly, in these particular embodiments, the communication handling module may or may not be configured to consider whether a trigger event has occurred for a treatment whenever a communication is received.

Further, in particular embodiments, when a trigger event occurs, any communication currently in a given sub-queue will remain in the sub-queue at its current position regardless of whether the value for the communication still fits within the redefined sub-queue value range for the sub-queue. Therefore, such a communication is allowed to process in a normal manner through the sub-queue until the communication is routed to an agent or is abandoned.

At this point, the communication handling module determines whether the current session is over for the contact center in Operation 550. For instance, the communication handling module determines whether the current workday has ended for the contact center. If not, then the communication handling module returns to Operation 510 to receive another communication. If the current session is over, then the communication handling module simply ends the process.

Returning to Operation 515, if the communication handling module instead determines the communication is a "chain-type" communication, then the communication handling module queries the chains of communication that are currently active for the contact center in Operation 555. As discussed in further detail herein, in various embodiments, the contact center keeps track of on-going chains of communication that are taking place between an agent and a remote party.

For example, a remote party may have sent an inbound text message to the contact center and accordingly, the text message is assigned a treatment, placed in an appropriate sub-queue of the treatment, and subsequently forwarded to an agent who is servicing the sub-queue and becomes available. Accordingly, the agent responds to the text message by sending the remote party a response text message. In this instance, the agent is expecting a further response text message from the remote party and identifies such to the contact center. As a result, the contact center considers the exchange of text messages taking place between the agent and the remote party as an active chain of text messages and tracks the exchange accordingly.

Therefore, in Operation 560, the communication handling module determines whether the received communication is part of an active chain. For example, in particular embodiments, the communication handling module may determine whether the telephone number from which an inbound text message was received or an email address from which an email was sent is connected to a chain that is currently active. If not, then the communication handling module treats the communication as new and invokes the process communication module in Operation 520.

However, if instead the communication handling module determines the received communication is part of an active chain, then the communication handling module determines whether the communication is inbound in Operation 565. This particular operation is performed in particular embodiments because the contact center does not treat a given chain of communications as a single continuous communication. Instead, each inbound communication received from a remote party that is part of an active chain is treated as a newly arrived inbound communication that is completed when an assigned agent sends a response to the remote party.

Such an approach can prevent the agent assigned to the chain from sitting idle while waiting interminably for a new inbound communication from the remote party for the chain since the inbound communication is considered completed and the agent can be made available to handle another communication. Thus, the contact center may instruct agents to create and deliver responses to inbound communications that are a part of an active chain as promptly as possible as a best practice.

Accordingly, if the communication handling module determines the communication is inbound, then the module invokes a process chain communication module in Operation 570. As discussed in further detail herein, the process chain communication module in various embodiments is configured to treat the inbound communication different than an inbound communication that is not part of a chain in that instead of placing the communication in a particular sub-queue of a selected treatment, the process chain communication module routes the communication to a particular agent who has been assigned to handle the chain of communications.

However, if instead the communication handling module determines the communication is outbound, then the module invokes a process chain communication response module in Operation 575. As discussed herein, the process chain communication response module is configured in various embodiments to make the agent available who is associated with the chain involved with the outbound communication and to close the chain if the agent has indicated the chain has been terminated. At this point, the communication handling module determines whether the current session is over for the contact center in Operation 550. Again, if not, then the communication handling module returns to Operation 510 to receive another communication. If the current session is over, then the communication handling module simply ends the process.

Process Communication Module

Figure 6:
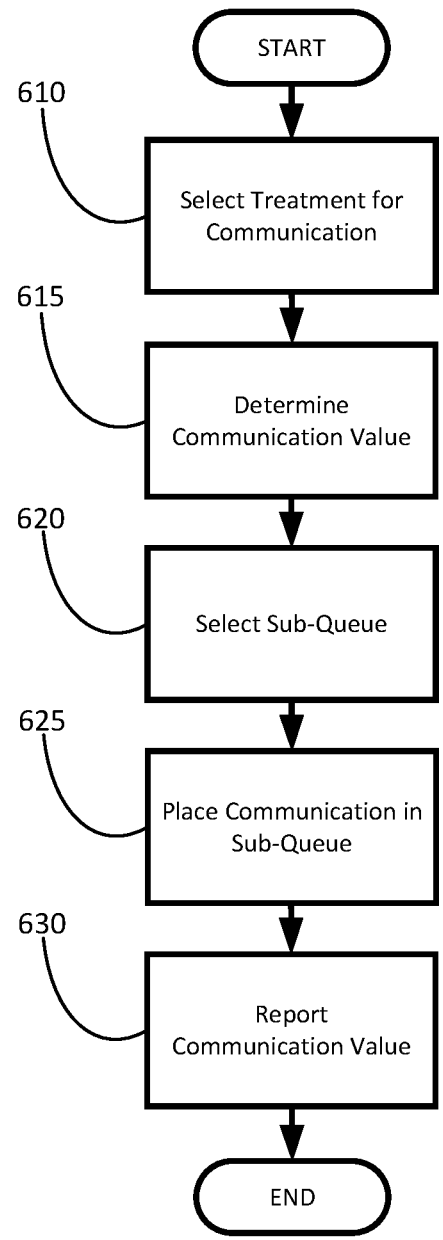
FIG. 6 illustrates a process flow for applying a selected treatment to a communication in accordance with various embodiments of the present invention.

Turning now to FIG. 6, additional details are provided regarding a process flow for applying a selected treatment to a communication according to various embodiments of the invention. In particular, FIG. 6 is a flow diagram showing a process communication module for performing such functionality according to various embodiments of the invention. For example, the flow diagram shown in FIG. 6 may correspond to operations carried out by one or more processors in one or more components, such as, for example, the communications handler 150 described above, as it executes the process communication module stored in the component's volatile and/or nonvolatile memory.

The process for applying a selected treatment to a communication begins with the process communication module selecting a treatment for the communication in Operation 610. As previously discussed, depending on the embodiment, this operation may entail the process communication module making use of some type of selection logic based on criteria and/or business rules that enable the process communication module to select the most appropriate treatment for the communication.

Next, the process continues with the process communication module determining a value for the communication in Operation 615. As already discussed, the process communication module in various embodiments determines the value of a communication based on the selected treatment for the communication. In other words, the various treatments supported by a contact center may have different approaches for determining the value of communications.

Once the process communication module has determined a value for the communication, the process communication module selects a sub-queue for the communication in Operation 620. Here, the process communication module selects the sub-queue based on the value of the communication and the value ranges assigned to the different sub-queues making up the treatment. Next, the process communication module places the communication in the selected sub-queue in Operation 625.

At this point, the communication stays in the sub-queue until an agent who is servicing the sub-queue becomes available and the communication is forwarded to the available agent. In addition, in particular embodiments, when the communication is a "chain-type" communication and an agent becomes available to handle the communication, information on the communication may be recorded that indicates the communication is part of an active chain, the treatment assigned to the communication, the value determined for the communication, and/or the agent who has been assigned to handle the communication. This information may then be used, for example, when additional inbound communications are received for the chain so that the additional inbound communications are identified as part of an active chain and can be forwarded to the appropriate agent who is handling the chain.

Finally, in particular embodiments, the process communication module reports the value of the communication in Operation 630. For example, the process communication module may report the value of the communication to the communication handling module so that the communication handling module can update the window of time for the treatment with the determined value for the communication.

Process Chain Communication Module

Figure 7:
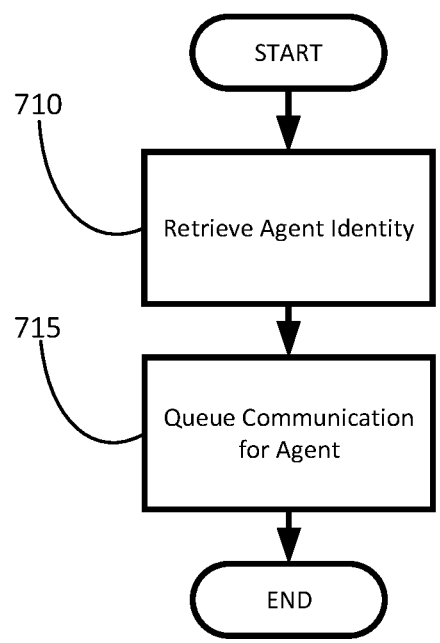
FIG. 7 illustrates a process flow for directing an inbound communication that is part of an active chain to the appropriate agent in accordance with various embodiments of the present invention.

Turning now to FIG. 7, additional details are provided regarding a process flow for directing an inbound communication that is part of an active chain to the appropriate agent according to various embodiments of the invention. In particular, FIG. 7 is a flow diagram showing a process chain communication module for performing such functionality according to various embodiments of the invention. For example, the flow diagram shown in FIG. 7 may correspond to operations carried out by one or more processors in one or more components, such as, for example, the communications handler 150 described above, as it executes the process chain communication module stored in the component's volatile and/or nonvolatile memory.

As already discussed, the process chain communication module is invoked in various embodiments when an inbound communication received by the contact center is determined to be part of an active chain of communications. Since the communication is part of an active chain, the chain will already have an agent assigned to handle the chain. Therefore, the process begins with the process chain communication module retrieving the identity of the agent who is handling the chain in Operation 710.

At this point, the process chain communication module queues up the communication for the agent in Operation 715. Accordingly, when the agent becomes available to handle a new communication, the component responsible for selecting and routing a communication to the agent (e.g., the communications handler 150) determines whether a specific communication has been queued up for the agent. If so, then the component routes the inbound communication to the agent to handle. In addition, the component may notify the agent that the inbound communication has been routed to him or her and that the communication is part of an active chain. For example, the component may be configured to provide some type of message on the agent's workstation monitor and/or some type of audible message over the agent's voice device 161a-161c.

Process Chain Communication Response Module

Figure 8:
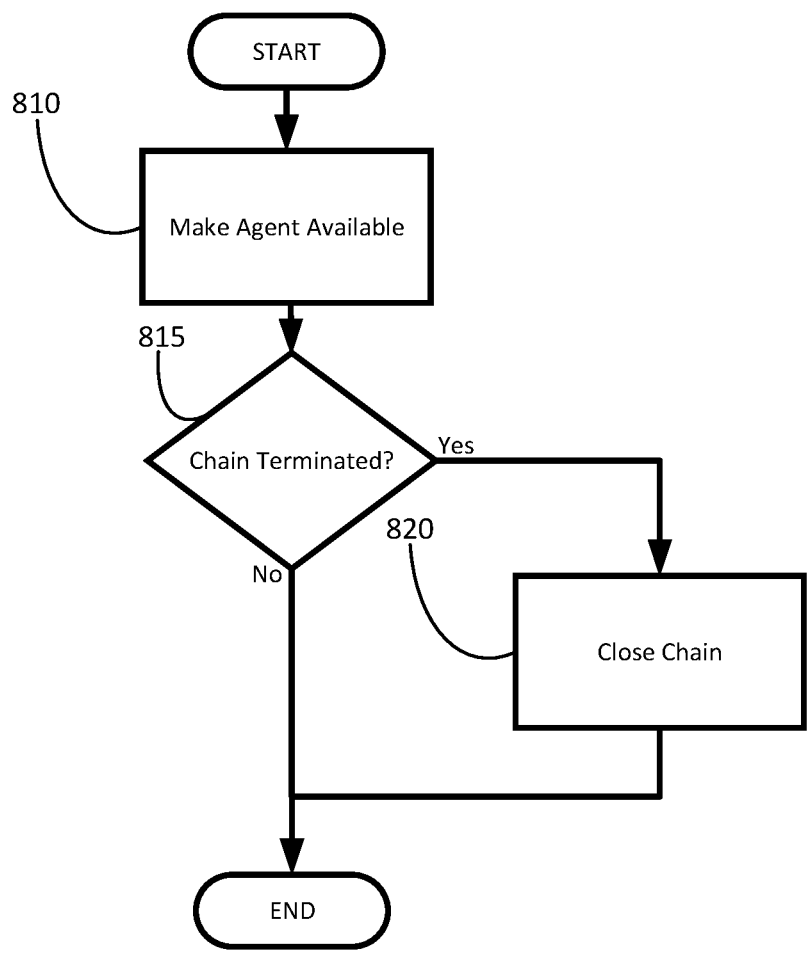
FIG. 8 illustrates a process flow for handling an instance where an outbound communication that is part of an active chain has been sent in accordance with various embodiments of the present invention.

Turning now to FIG. 8, additional details are provided regarding a process flow for handling an instance where an outbound communication that is part of an active chain has been sent according to various embodiments of the invention. In particular, FIG. 8 is a flow diagram showing a process chain communication response module for performing such functionality according to various embodiments of the invention. For example, the flow diagram shown in FIG. 8 may correspond to operations carried out by one or more processors in one or more components, such as, for example, the communications handler 150 described above, as it executes the process chain communication response module stored in the component's volatile and/or nonvolatile memory.

As already discussed, the process chain communication response module is invoked in various embodiments when an outbound communication being sent by the contact center is determined to be part of an active chain of communications. Again, since the communication is part of an active chain, the chain has an agent who is assigned to handle the chain. Therefore, the process begins with the process chain communication response module making the agent who is handling the chain available to handle another communication in Operation 810. As a result of making the agent available, the contact center may now route another communication to the agent.

In addition, the process chain communication response module determines whether the agent has indicated the chain has been terminated in Operation 815. For instance, in particular embodiments, each time the agent assigned to a chain of communications sends an outbound response communication to the remote party, the agent can indicate on his or her workstation whether the response communication concludes the chain of communications. In other words, the agent can indicate whether no further communications are to be exchanged between the agent and the remote party for the chain.

Therefore, if the process chain communication response module determines the chain has been terminated, then the module closes the chain in Operation 820. This particular operation may be carried out differently depending on the embodiment. For instance, in particular embodiments, the process chain communication response module may be configured to record some type of information for the chain indicating the claim has been terminated/closed. While in other embodiments, the process chain communication response module may deleted any information that is currently showing the chain as active. As a result, when information on the currently active chains of communication is viewed (queried), the chain involved with the outbound communication will no longer be found to be active.

A First Configuration of a Treatment Control Module

Figure 9:
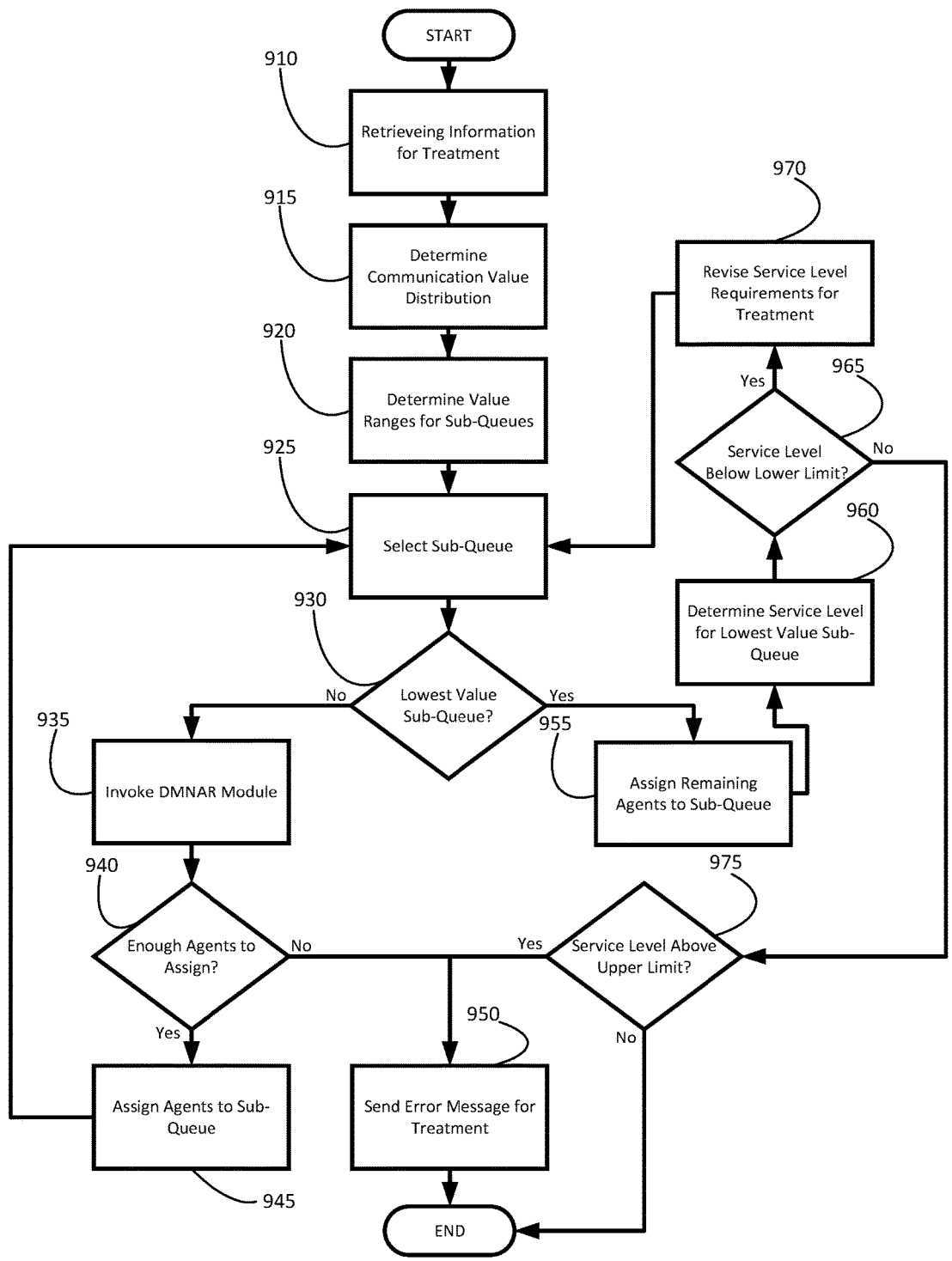
FIG. 9 illustrates a process flow for assigning the sub-queue value ranges and agents to the sub-queues for a treatment in accordance with various embodiments of the present invention.

Turning now to FIG. 9, additional details are provided regarding a process flow for assigning the sub-queue value ranges and agents to the sub-queues for a treatment at startup (e.g., at the beginning of a workday) or when some condition that can affect the performance of a treatment occurs (e.g., the communication arrival rate for the treatment changes) according to various embodiments of the invention. In particular, FIG. 9 is a flow diagram showing a first configuration for a treatment control module for performing such functionality according to various embodiments of the invention. For example, the flow diagram shown in FIG. 9 may correspond to operations carried out by one or more processors in one or more components, such as, for example, the communications handler 150 described above, as it executes the treatment control module stored in the component's volatile and/or nonvolatile memory.

As already mentioned, a contact center initially defines a family of treatments to be supported by the contact center that includes different treatments related to different reasons and/or opportunities for conducting communications with remote parties. Accordingly, a treatment is applied to a communication so that the communication is handled in a particular manner as defined by the treatment upon the communication arriving at the contact center (e.g., when the communication is received as an inbound communication by the contact center or is placed as an outbound communication by the contact center).

In addition, each treatment is divided into sub-queues to allow for communications to be further segregated based on a determined value for each communication to allow communications perceived as of higher importance to be handled by highly qualified agents in a more timely fashion than communications perceived as of lessor importance. Following such a practice allows for the contact center in many instances to obtain the most benefit from each communication handled by the contact center while also allowing total agent resources to be reduced below what is normally possible with conventional approaches.

However, the reality is conditions that can affect a treatment's perform change from day to day and at various times during the day. For example, a change can occur with respect to the number and mixture of active agents who are servicing a treatment, the communication arrival rate for the treatment, the distribution of communication values for the treatment, the agent availability rate for the treatment, and/or the current depth of communications actively on hold in the sub-queues of the treatment. Therefore, at various times during a workday, the contact center may want to re-establish the properties of a treatment such as, for example, the number of sub-queues that make up the treatment, the value ranges assigned to the sub-queues, and/or the agents assigned to support the sub-queues. Thus, in various embodiments, the contact center may perform a process at various times of the day to initialize and/or re-establish the properties of a particular treatment.

Accordingly, turning to FIG. 9, such a process begins in various embodiments with the treatment control module retrieving information for the treatment in Operation 910. Depending on the embodiment, this information may include data on such items as the sub-queues that make up the treatment, the percentage of communication volume to be handled by each sub-queue, the service level requirement for each sub-queue, and/or a set of communications (e.g., a moving window of time) that were applied the treatment. Depending on the embodiment, this information may be retrieved by the treatment control module from some type of storage media within or outside of the contact center.

The treatment control module initially determines a communication value distribution for the treatment from the set of communications in Operation 915. Here, the treatment control module performs this operation in particular embodiments by first reading (or computing) a communication value for each communication found in the set of communications and then deriving a communication value distribution from the communication values.

As previously mentioned, when the contact center is starting up a process for handling communications at the beginning of a workday and is initiating the properties of the treatment, the set of communications typically includes historical records of communications that the treatment was applied to over a past time period such as, for example, a set of communications from the previous workday. In these instances, the derived communication value distribution may be referred to as a start of the day communication value distribution. However, as the workday progresses and the contact center is re-establishing the properties of the treatment because some condition may have changed that may affect the performance of the treatment, then the set of communications typically includes records of more recent communications that may have been applied the treatment during the current workday. In these instances, the derived communication value distribution may be referred to as a real-time communication value distribution.

At this point, the treatment control module uses the retrieved information and communication value distribution to determine the value ranges for the sub-queues that make up the treatment in Operation 920. Here, in particular embodiments, the treatment control module determines value thresholds for the different sub-queues based on the communication value distribution and the percentage of communication volume to be handled by each sub-queue.

For example, the treatment may be made up of four sub-queues (sub-Q1, sub-Q2, sub-Q3, and sub-Q4, with sub-Q1 being the highest value sub-queue) and the range of communication values found in the set of communications may be 10 to 300. Here, the contact center may have established that for the communications that are applied the treatment: 10% of the communications should be placed in sub-Q1; 20% of the communications should be placed in sub-Q2; 30% of the communications should be placed in sub-Q3; and 40% of the communications should be placed in sub-Q4. Accordingly, the treatment control module derives a communication value distribution based on the communication values found in the set of communications and determines that the value thresholds between the four sub-queues is 243, 188, and 124, respectfully, based on the distribution. Therefore, the treatment control module determines the value ranges for the sub-queues to be sequentially positioned at: ≥243 for sub-Q1, 242 to 188 for sub-Q2, 187 to 124 for sub-Q3, and <123 for sub-Q4.

At this point, the treatment control module selects a first sub-queue that makes up the treatment in Operation 925. For instance, in particular embodiments, the treatment control module is configured to initially select the highest value sub-queue for the treatment and then subsequently, select the next highest value sub-queue, and so forth, until the module finally selects the lowest value sub-queue for the treatment. Therefore, returning to the example, the treatment control module initially selects sub-Q1.

The treatment control module then makes a determination as to whether the selected sub-queue is the lowest value sub-queue for the treatment in Operation 930. In the example, since the treatment control module has initially selected sub-Q1, the module determines the lowest value sub-queue for the treatment (e.g., sub-Q4) has not been selected. Therefore, the treatment control module determines the number of agents needed to be assigned to the selected sub-queue. For instance, in particular embodiments, the treatment control module performs this particular operation by invoking a determine minimum number of agents required ("DMNAR") module in Operation 935. Accordingly, the DMNAR module returns a minimum number of agents that are required to be assigned to the sub-queue such as, for example, 63 agents.

At this point, the treatment control module determines whether enough agents who have been made available to handle communications for the treatment are available to service the sub-queue in Operation 940. That is to say, in the example, the treatment control module determines whether 63 agents who have been made available to handle communications for the treatment are available to service sub-Q1. If so, then the treatment control module assigns the available agents to the sub-queue in Operation 945.

As previously discussed, in various embodiments, each agent who is available to handle communications for a particular treatment is given a ranking value and this ranking value is used in staffing the various sub-queues for the treatment. For example, in this particular instance, the treatment control module selects the first (top) 63 agents from the ranking and assigns these agents to sub-Q1. As for the next sub-queue, the treatment control module would then select the remaining agents from the top of the ranking to assign to that sub-queue and so on. Thus, once the treatment control module has assigned the agents to the particular sub-queue, the module returns to Operation 925 to select the next sub-queue for the treatment.

Returning to Operation 940, if the treatment control module determines instead that not enough agents are available to assign to the sub-queue, then the treatment control module sends an error message for the treatment in Operation 950. This error message may take various forms depending on the embodiment and is primarily used to advise the contact center (personnel of the contact center) that the sub-queues for the particular treatment could not be adequately staffed to maintain the service level requirements for the sub-queues of the treatment.

Returning now to Operation 930, if the treatment control module determines that the selected sub-queue for the treatment is the lowest value sub-queue (the selected sub-queue is sub-Q4 in the example), then the treatment control module assigns to the lowest value sub-queue the remaining agents in the ranking who are available to handle communications for the treatment and who have not already been assigned to a sub-queue in Operation 955.

Unlike the other sub-queues of the treatment, the lowest value sub-queue is not assigned a service level requirement in various embodiments. Instead, the lowest value sub-queue acts as an overflow to absorb excess queue volume for the treatment. Therefore, in particular embodiments, when wait times become too long for this particular sub-queue (e.g., above a threshold amount) then messages may be provided to parties associated with the communications placed in this sub-queue advising them of the long wait times and suggesting the parties contact the center at a later time.

However, with that said, the contact center may be concerned with what level of service is being provided to the lowest value sub-queue based on the agents who have been assigned to this sub-queue. Therefore, returning to FIG. 9, the treatment control module in particular embodiments determines the service level being provided to the lowest value sub-queue in Operation 960. In this instance, the treatment control module generally performs this operation in reverse with respect to the computation performed in determining the number of agents to assign to the other sub-queues. Instead of determining a number of agents to assign to a sub-queue based on an estimated communication arrival rate, an estimated agent availability rate, and a service level requirement, the treatment control module determines a service level based on an estimated communication arrival rate, an estimated agent availability rate, and a number of agents who have been assigned to the lowest value sub-queue.

As previous mentioned, if the service level indicates a very low wait time for communications placed in the lowest value sub-queue then this typically indicates the treatment may be overstaffed and/or the service levels for the other sub-queues may be tightened. However if the opposite is true and the service level indicates a very long wait time for communications placed in the lowest value sub-queue then this typically indicates the treatment may need to be further staffed and/or the service levels for the other sub-queues may need to be relaxed.

Therefore, in various embodiments, the treatment control module determines whether the service level for the lowest value sub-queue is below a lower limit in Operation 965. Again, if the service level is below the lower limit, such an occurrence may signal the treatment is overstaffed and/or the service levels for the other sub-queues should be tightened. In this instance, the treatment control module handles such an occurrence by revising the service level requirements for the treatment in Operation 970.

Here, the treatment control module may be configured, depending on the embodiment, to revise the service level requirements for the sub-queues of the treatment based on some formalistic approach and/or by replacing the service level requirements with more stringent requirements. For example, in one embodiment, the treatment control module may be configured to shift the current service level requirements down one sub-queue and drop the service level requirement for the sub-queue next to the lowest value sub-queue. The treatment control module may then assign a more stringent service level requirement to the highest value sub-queue.

For instance, the current service level requirements assigned to sub-Q1, sub-Q2, and sub-Q3 may be 95% of communications be connected with an agent in no more than 2 seconds, 80% of communications be connected with an agent in no more than 3 seconds, and 75% of communications be connected with an agent in no more than 5 seconds, respectively. Therefore, in this example, the treatment control module would assign the service level requirement 95% of communications be connected with an agent in no more than 2 seconds to sub-Q2 and the service level requirement 80% of communications be connected with an agent in no more than 3 seconds to sub-Q3. The service level requirement 75% of communications be connected with an agent in no more than 5 seconds would be dropped. The treatment control module would then assign a more stringent service level requirement such as, for example, 98% of communications to be connected with an agent in no more than 2 seconds to sub-Q1. At this point, the treatment control module would then return to Operation 925 and repeat the process for the sub-queues based on the revised service level requirements for the sub-queues of the treatment.

If instead the treatment control module determines the service level of the lowest value sub-queue is not below the lower limit, then the treatment control module in particular embodiments determines whether the service level of the lowest value sub-queue is above an upper limit in Operation 975. Again, if the service level is above the upper limit, such an occurrence typically indicates the treatment may need to be further staffed and/or the service level requirements for the other sub-queues may need to be relaxed. If the service level of the lowest value sub-queue is above the upper level, then the treatment control module in these particular instances sends an error message for the treatment indicating such in Operation 950. Here, the error message may signal to personnel at the contact center that the particular treatment needs to be address by adding more staff to the treatment and/or by adjusting the service level requirements for one or more of the sub-queues. At this point, the treatment control module ends the process.

Determine Minimum Number of Agents Required Module

Figure 10:
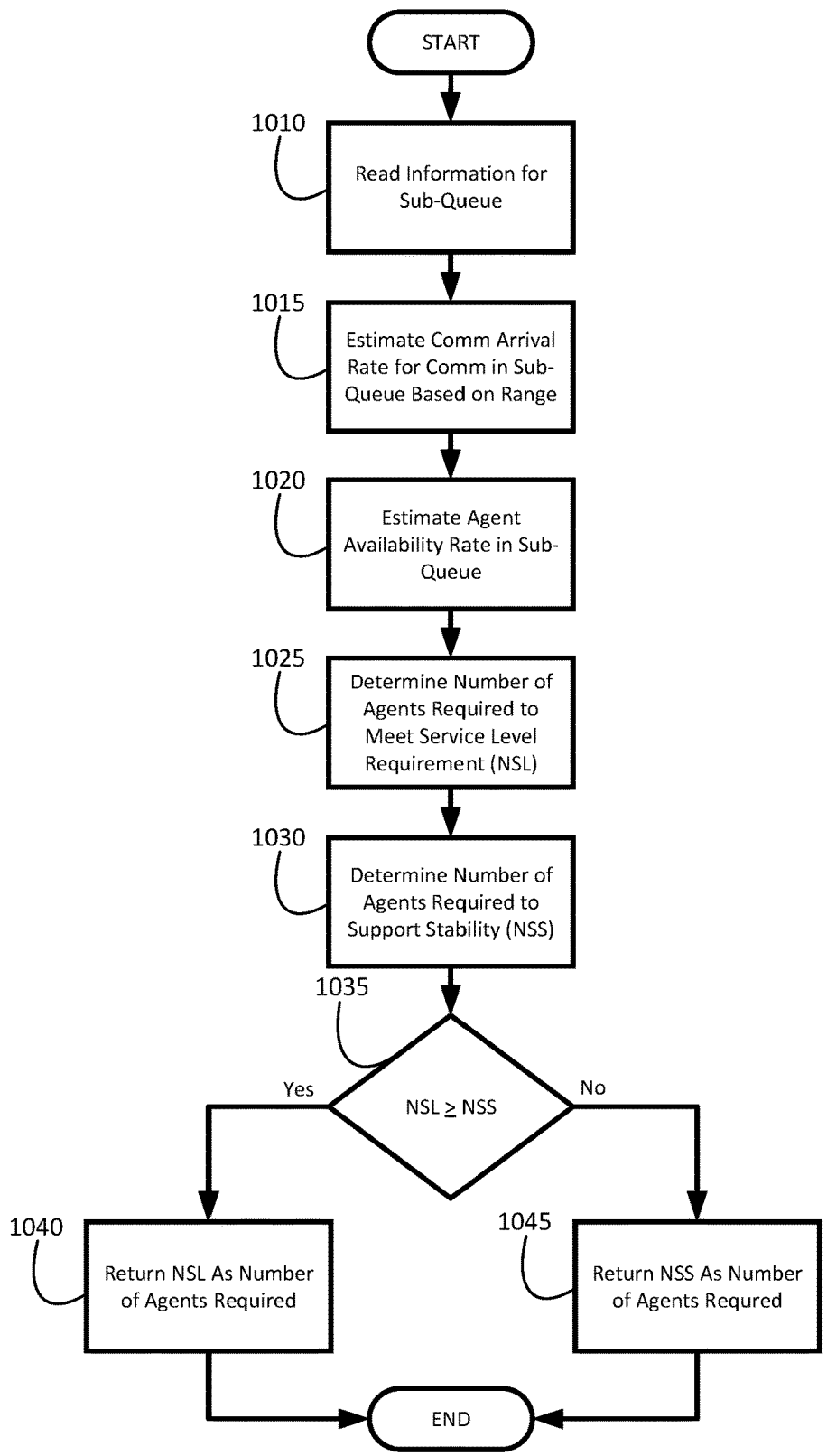
FIG. 10 illustrates a process flow for determining the minimum number of agents needed to assign to a sub-queue in accordance with various embodiments of the present invention.

Turning now to FIG. 10, additional details are provided regarding a process flow for determining the minimum number of agents required for a sub-queue to meet the service requirement of the sub-queue and to support stability of the sub-queue according to various embodiments of the invention. In particular, FIG. 10 is a flow diagram showing a determine minimum number of agents required ("DM-NAR") module for performing such functionality according to various embodiments of the invention. For example, the flow diagram shown in FIG. 10 may correspond to operations carried out by one or more processors in one or more components, such as, for example, the communications handler 150 described above, as it executes the DMNAR module stored in the component's volatile and/or nonvolatile memory.

As previously mentioned, the treatment control module invokes the DMNAR module in various embodiments to provide the treatment control module with a minimum number of agents required to be assigned to a particular sub-queue of a treatment to meet the service level requirement set for the sub-queue and to support stability. Accordingly, the treatment control module invokes the DMNAR module and the DMNAR module reads the information for the sub-queue in Operation 1010. Depending on the embodiment, the information may include the percentage of communication volume the sub-queue is set to handle, the value range for the sub-queue, the service level requirement set for the sub-queue, and/or communications from the set of communication that would be assigned to the sub-queue.

The DMNAR module estimates the arrival rate of communications in the sub-queue based on the communications found in the set of communications that would be assigned to the sub-queue in Operation 1015. Likewise, the DMNAR module estimates the agent availability rate in the sub-queue in Operation 1020. Here, in particular embodiments, the DMNAR module may estimate the agent availability rate based on the average of a sum of time used by an agent to handle a communication assigned to the sub-queue and time for other activities that may delay an agent from handling another communication that are not normally covered in the average handle time. While in other embodiments, the DMNAR module may estimate the agent availability rate based on the ratio of the number of times communications assigned to the sub-queue are connected to agents, to the length of the time interval in which those connections to agents are made. Again, the DMNAR module may use information gathered on the communications found in the set of communications that would be assigned to the sub-queue. At this point, the DMNAR module determines the minimum number of agents required to be assigned to the sub-queue to meet the service level requirement for the sub-queue in Operation 1025 ("NSL").

For instance, returning to the example previously discussed, the treatment control module invokes the DMNAR module to determine the number of agents required to be assigned to sub-Q1. Here, the DMNAR module reads the information on sub-Q1 and estimates the communication arrival rate by determining the average arrival rate for communications in sub-Q1 is 600 communications per hour (or one communication every 6 seconds). In addition, the DMNAR module estimates the agent availability rate by determining the average agent availability rate for these communications is 5 minutes (or an average agent availability rate of 300 seconds). In this example, the contact center has set the service level requirement to 95% of the communications placed in sub-Q1 are to be routed to an agent in no more than two seconds. Therefore, the DMNAR module applies some type of standard contact center sizing computation, such as Erlang C, for example, to the estimates and the service level requirement and determines the number of agents needed for sub-Q1 is 63.

Furthermore, in particular embodiments, the contact center may establish a minimum number of agents required for a sub-queue to support stability. Thus, in these particular embodiments, the number of agents assigned to each sub-queue cannot be below this minimum number to support stability of the treatment control process. Therefore, in Operation 1030, the DMNAR module determines the minimum number of agents needed to support stability of the sub-queue ("NSS").

Depending on the circumstances, the minimum number needed to support stability may vary based on various operational conditions. Here, extensive simulation studies may be used to develop some type of reference such as a look up table that provides the minimum number of agents needed based on all operational conditions that may occur in a call center. One embodiment of those simulation studies involves performing an extensive survey of operational conditions in existing call centers to determine the range and combinations of values of key performance parameters such as call arrival rate and agent arrival rate. Separate simulation cases are executed addressing each of the identified combinations of values of key performance parameters, and the results of those simulation cases form the basis for creating the table that provides the minimum number of agents needed for any choice of call center operational conditions. An alternate approach to use of a look up table involves computing in real time the levels of dispersion of key performance parameters that result from the sample sizes induced by the number of agents assigned to a sub-queue, and using those dispersion levels to identify the minimum number of agents that need to be assigned to a sub-queue based on control of that dispersion. Specific embodiments of quantities characterizing the dispersion of the key performance parameters include the standard deviation and the average absolute deviation.

At this point, the DMNAR determines whether the minimum number of agents required to be assigned to the sub-queue to meet the service level requirement for the sub-queue ("NSL") is greater than or equal to the minimum number of agents needed to support stability of the sub-queue in Operation 1035. If the NSL is greater than or equal to the NSS, then the DMNAR module returns the NSL to the treatment control module as the minimum number of agents required to be assigned to the sub-queue in Operation 1040. However, if the NSL is not greater than or equal to the NSS, then the DMNAR module returns the NSS to the treatment control module as the minimum number of agents required to be assigned to the sub-queue in Operation 1045.

A Second Configuration of the Treatment Control Module

Figure 11:
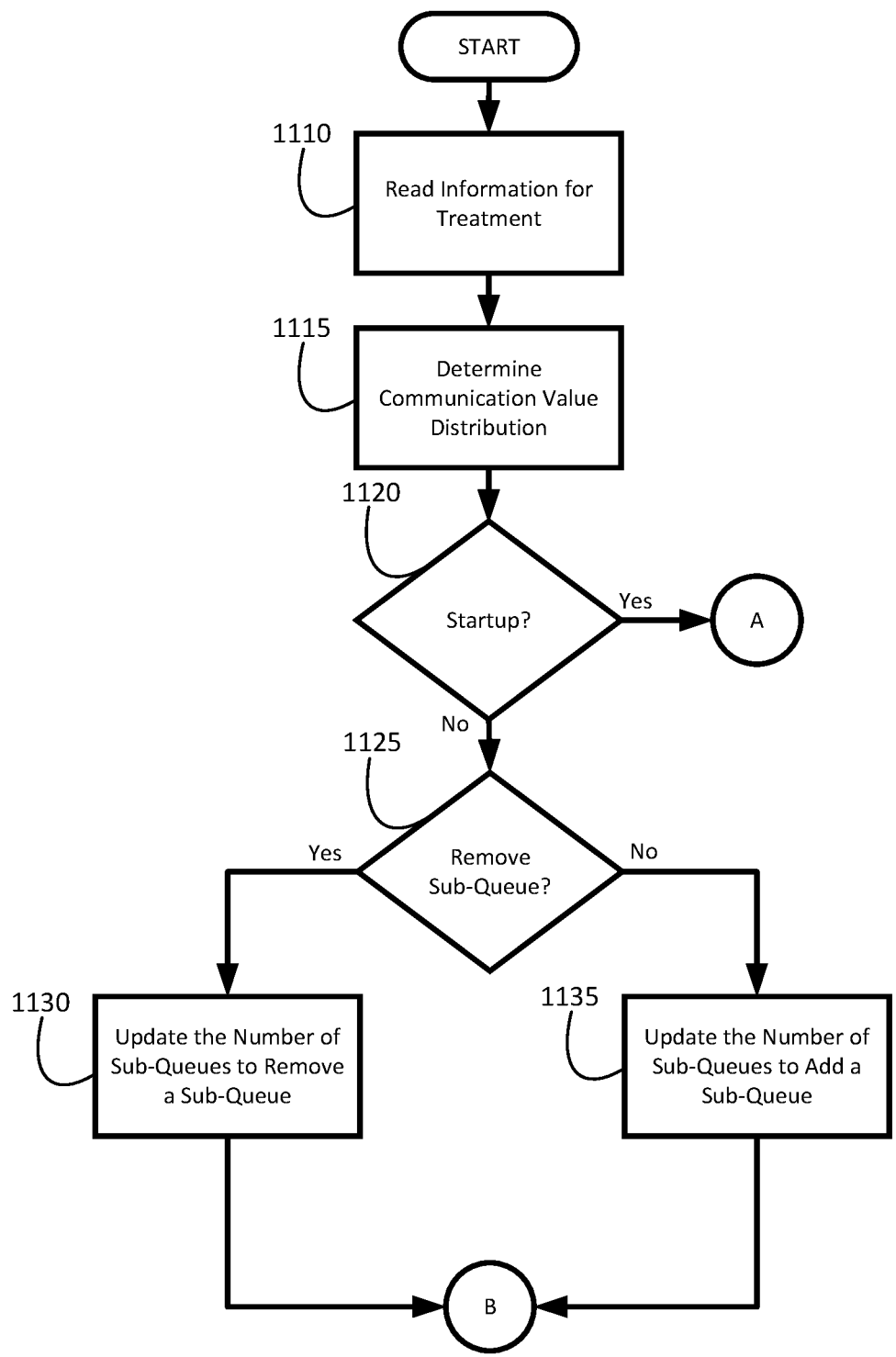
FIGS. 11-13 illustrate a second process flow for assigning the sub-queue value ranges and agents to the sub-queues for a treatment in accordance with various embodiments of the present invention.
Figure 12:
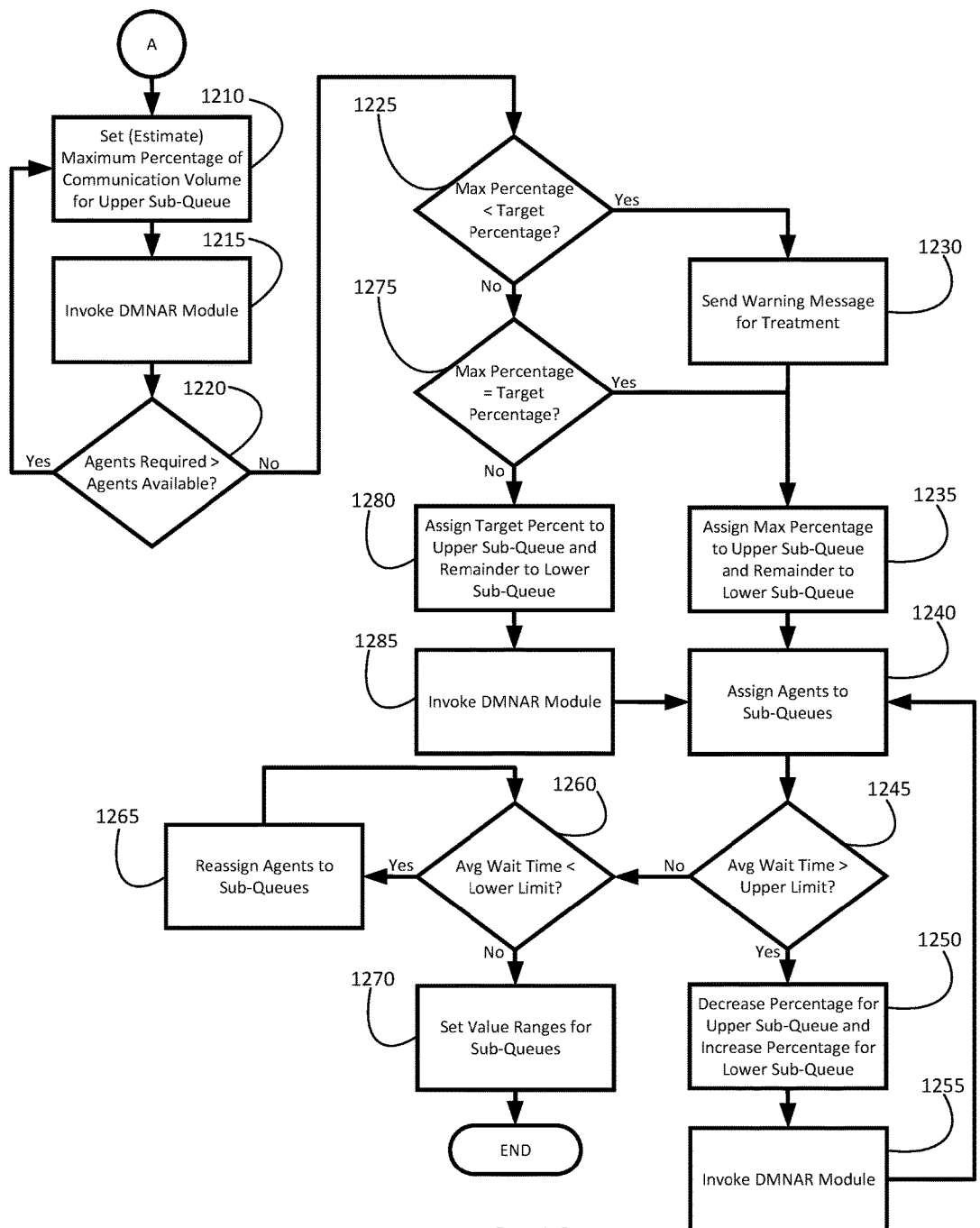
Figure 13:
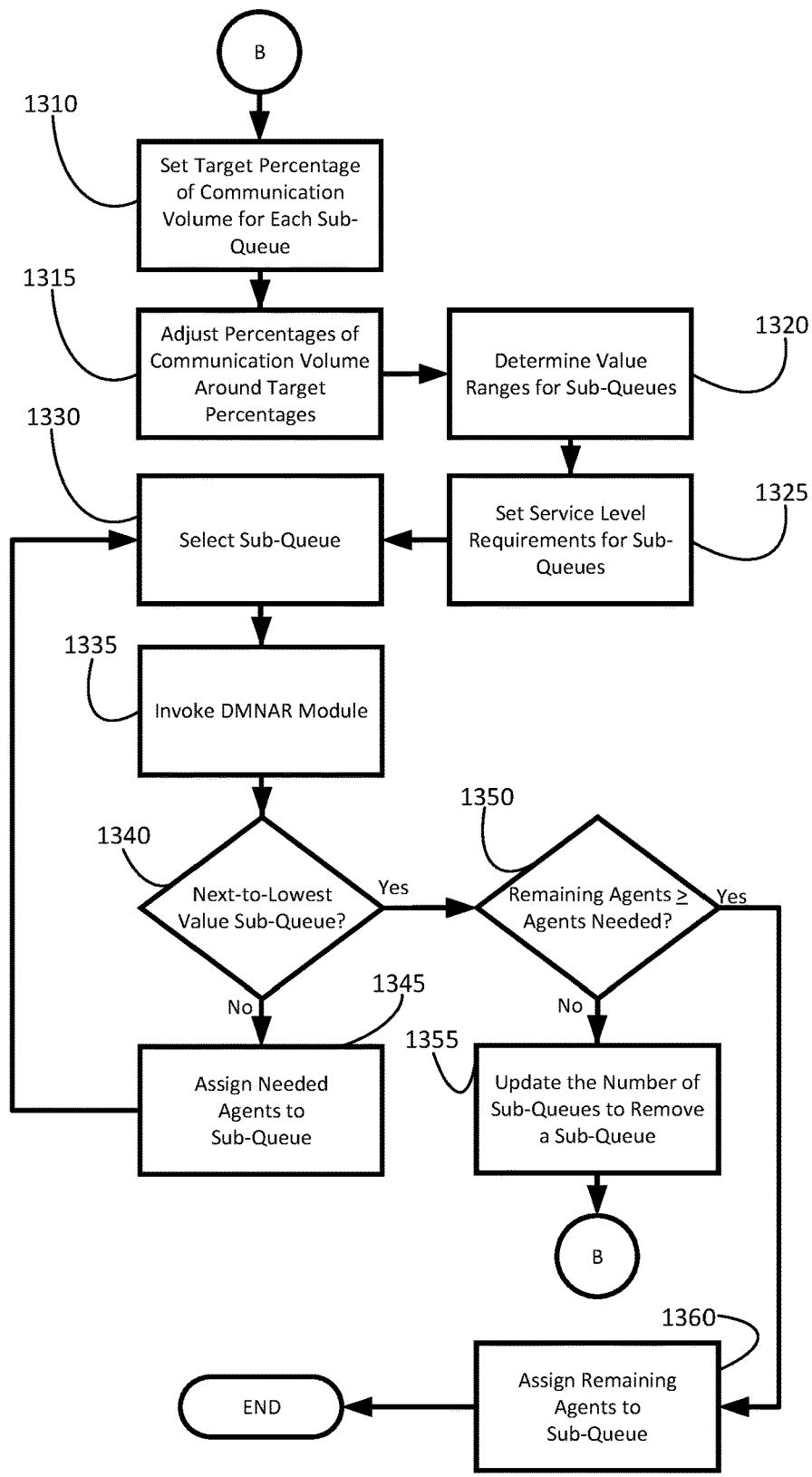

Turning now to FIGS. 11-13, additional details are provided regarding a second process flow for assigning the sub-queue value ranges and agents to the sub-queues for a treatment at startup or when some condition that can affect the performance of a treatment occurs according to various embodiments of the invention. In particular, FIGS. 11-13 provide a flow diagram showing a second configuration of the treatment control module previously discussed for performing such functionality according to various embodiments of the invention.

Here, the process flow shown in FIGS. 11-13 is a more advanced form of controlling treatment properties in that the process flow allows for the number of sub-queues that make up a treatment to also be updated, in addition to updating the assignment of the sub-queue value ranges and agents to the sub-queues. That is to say, the number of sub-queues that make up a treatment is not fixed for this particular configuration. In addition, the percentage of communication volume assigned to each sub-queue to handle is an approximate (soft) target and not a hard constraint. Therefore, the process flow shown in FIGS. 11-13 also allows for these percentages to be dynamically determined and updated on an ongoing basis.

In general having more sub-queues in a treatment is better, since this allows communications to be assigned to the most beneficial wait time requirement and treatment quality level possible based on the communications' values. Thus, an objective of using the process flow shown in FIGS. 11-13 in various embodiments is to identify the maximum number of sub-queues that each treatment can support and still maintain stability. Therefore, a trigger event used to invoke the configuration of the treatment control module shown in FIGS. 11-13 in various embodiments is an indication that a sub-queue should be add or removed from a particular treatment.

For instance, one of these trigger events may be the detection of a lower value sub-queue for a treatment having insufficient agent resources to consistently meet the service level requirement set for the sub-queue. Accordingly, this particular trigger event typically indicates a sub-queue should be removed from the treatment. While another one of these trigger events may be the detection of one or more of the sub-queues for a treatment appearing to have a surplus of agents high enough to support an additional sub-queue. Accordingly, this particular trigger event typically indicates a sub-queue should be added to the treatment.

For example, the communication handling module previously discussed may be configured to monitor the average wait time for communications placed in the lowest value sub-queue for a treatment. Here, if the communication handling module determines the average wait time is higher than a threshold value, such a determination may identify an instance (a trigger event) in which the number of sub-queues for the treatment needs to be reduced. Similarly, the communication handling module may be configured to determine if the total number of surplus agents for a treatment is as large as the number of agents needed by the next-to-lowest value sub-queue to maintain stability. Here, the number of surplus agents for a given sub-queue is the difference between the number of agents assigned to the sub-queue and the minimum number of agents needed for the sub-queue to maintain stability and meet its service level requirement and the total number of surplus agents is the sum of the surplus agents for each sub-queue except the lowest value sub-queue. If so, then such a determination may identify an instance (a trigger event) in which the number of sub-queues for the treatment needs to be increased.

When this particular configuration of the treatment control module is invoked for a treatment at startup (e.g., at the beginning of a workday) in particular embodiments, the treatment typically includes only two sub-queues initially since this is the highest possible number of sub-queues that can be assumed to guarantee start-up stability. However, as the workday progresses, the number of sub-queues may increase as the treatment is able to meet and exceed the service level requirements set for the sub-queues of the treatment. Consequently, the number of agents assigned to a particular treatment may play a major factor in the maximum number of sub-queues the treatment can accommodate and still support stability and service level requirements. Here, stability relies on determining various quantities with reasonable accuracy at the sub-queue level such as communication arrival rate and agent availability rate and this accuracy depends on the size of the sample used to compute these quantities. Therefore, a major driver of stability is the number of agents assigned to each sub-queue in the sense that a single sub-queue (other than the lowest value sub-queue) with a very small number of agents may destabilize control. Thus, the process flow shown in FIGS. 11-13 addresses such factors in adjusting the number of sub-queues and the sub-queue value ranges to achieve the maximum number of sub-queues possible to maintain stability.

For instance, at startup when a treatment is made up of only two sub-queues, the process flow shown in FIG. 11-13 ensures in various embodiments that the upper value (highest value) sub-queue has enough agents initially assigned to it to support its service level requirement for the percentage of communication volume the sub-queue is expected to handle and also that the lower value (lowest value) sub-queue has enough agents initially assigned to it to avoid excessively long wait times and to maintain stability of the treatment control process. However, as the workday progresses, the capacity to add sub-queues may emerge as a result of the number of agents assigned to the highest value sub-queue, or some other sub-queue besides the lowest value sub-queue, becomes significantly more than what is required to meet its service level requirement or the wait times for communications placed in the lowest value sub-queue become very short.

Furthermore, an inability to maintain the current number of sub-queues may emerge as the workday progresses as a result of the number of agents assigned to the highest value sub-queue, or some other sub-queue besides the lowest value sub-queue, becoming less than what is required to meet its service level requirement or the wait times for communications placed in the lowest value sub-queue becoming excessively long. Here, as these occurrences emerge and are recognized, various embodiments of the process flow shown in FIGS. 11-13 update the properties of the treatment to continue to ensure that enough agents are assigned to each sub-queue, except the lowest value sub-queue, to allow the corresponding service level requirement to be satisfied for the percentage of communication volume the sub-queue is expected to handle as well as ensure the lowest value sub-queue has enough agents to avoid excessively long wait times and to maintain stability of the treatment control process.

Turning now to FIG. 11, as with the other configurations of the treatment control module, the process begins in various embodiments with the treatment control module reading information for the treatment in Operation 1110 and determining a communication value distribution for the treatment from a set of communications in Operation 1115. As already discussed, depending on the embodiment, this information may include data on such items as the sub-queues that make up the treatment, the percentage of communication volume currently established to be handled by one or more sub-queues, the service level requirement currently established for one or more sub-queues, the value ranges currently established for one or more sub-queues, and/or a set of communications (e.g., a moving window of time) that were applied the treatment. In addition, the information may indicate whether a sub-queue should be added to or removed from the treatment.

Next, the treatment control module determines whether a treatment is to be started up at the beginning of a workday in Operation 1120. Here, in various embodiments, a treatment is placed in a startup mode when the treatment is started up on a given day. Accordingly, if the treatment is to be started up in particular embodiments, then the treatment is only to include two sub-queues with the upper sub-queue (the highest value sub-queue) of the treatment having a defined (set) service level requirement and a target percentage of communication volume to handle for the treatment. For example, the contact center may set the target percentage of communication volume for the upper value sub-queue to handle between two percent and five percent.

Thus, upon the treatment control module determining a treatment is to be started up, the module performs the startup mode portion of the process flow shown in FIG. 12. Turning now to FIG. 12, the treatment control module begins this portion of the process flow by determining the maximum percentage of communication volume that can be assigned to the upper sub-queue and still meet performance requirements for that sub-queue with the available agents. Here, the treatment control module determines the maximum percentage of communication volume as the percentage of communication volume that can be assigned to the upper sub-queue and still have enough agents to meet the upper sub-queue's service level requirement and support stability. It may occur that the maximum percentage is less than one-hundred percent and requires that all the treatment's agents be assigned to the upper sub-queue to meet those performance requirements.

Accordingly, the treatment control module sets the maximum percentage of communication volume for the upper sub-queue in Operation 1210. At a first pass, the treatment control module in various embodiments initially sets (estimates) the maximum percentage of communication volume for the upper sub-queue to one-hundred percent, and then for subsequent passes subtracts an increment of the percentage each time the module determines the upper sub-queue cannot support the current amount set (estimated) for the maximum percentage of communication volume for the upper sub-queue to handle with the agents available Upon setting (estimating) the maximum percentage of communication volume, the treatment control module then determines the minimum number of agents required to be assigned to the upper sub-queue in Operation 1215. As previously mentioned, the treatment control module performs this operation in various embodiments by invoking the DMNAR module, and the DMNAR module returns the required number of agents to the treatment control module.

Here, the required number of agents identifies a minimum number of agents needed to be assigned to the upper sub-queue to maintain the service level requirement set for the upper sub-queue and support stability at the maximum percentage of communication volume currently set for the sub-queue. If the required number of agents is greater than the number of agents available to handle communications for the treatment (the pool of agents available to handle communications for the treatment) then the upper sub-queue cannot support the maximum percentage of communication volume currently set (estimated) for the sub-queue.

Thus, in Operation 1220, if the treatment control module determines the required number of agents for the upper sub-queue at the current maximum percentage of communication volume set for the sub-queue is greater than the number of agents currently available to the treatment, then the treatment control module returns to Operation 1210 and re-sets the maximum percentage of communication volume to be handled by the upper sub-queue to a smaller amount. For instance, in particular embodiments, the treatment control module may be configured to reduce the maximum percentage of communication volume by some incremental percentage, such as one, two, or five percent. At this point, the treatment control module repeats Operations 1215 to 1220 until the required number of agents for an estimated maximum percentage of communication volume for the upper sub-queue to handle is equal to or less than the number of agents currently available to handle communications for the treatment.

Once the maximum percentage of communication volume that can be handled by the upper sub-queue has been identified, the treatment control module determines whether the maximum percentage is less than the target percentage of communication volume set for the upper sub-queue in Operation 1225. If so, such an occurrence generally indicates the pool of agents that have been assigned to the treatment (or who are actually available to handle communications for the treatment) is understaffed. Accordingly, in particular embodiments, when the treatment control module determines such an occurrence, the module sends a warning message about the treatment to the appropriate personnel of the contact center in Operation 1230. For example, the treatment control module may send one or more of a message that is displayed on a terminal, an email, or a text message to the appropriate personnel so that action can be taken to correct the understaffing.

Accordingly, the treatment control module then initially assigns the maximum percentage of communication volume to the upper sub-queue and the remainder of percentage of communication volume to the lower sub-queue in Operation 1235. At this point, the treatment control module assigns agents to the upper and lower sub-queues in Operation 1240. Thus, in particular embodiments, this operation entails the treatment control module assigning the minimum number of agents required to be assigned from the pool of agents available to handle communications for the treatment to the upper sub-queue and assigning the remainder of agents from the pool to the lower sub-queue. Note that since the treatment control module has already invoked the DMNAR module to determine the number of agents required to support the upper sub-queue at the determined maximum percentage of communication volume, the treatment control module is aware of the number of agents needed to be assigned to the upper sub-queue. In addition, as previously discussed, in various embodiments, each agent who is available to handle communications for a particular treatment is given a ranking value and this ranking value is used in staffing the various sub-queues for the treatment.

Continuing, in particular embodiments, the contact center may define upper and lower limits on the average wait time for the lower sub-queue. Therefore, in these particular embodiments, the treatment control module may determine the average wait time for communications placed in the lower sub-queue based on the percentage of communication volume the lower sub-queue is to handle and determine whether the average wait time is greater than the upper limit in Operation 1245. If so, the treatment control module shifts communication volume by decreasing the percentage of communication volume to be handled by the upper sub-queue and increasing the percentage of communication volume to be handled by the lower sub-queue by the same amount in Operation 1250. Again, depending on the embodiments, the treatment control module may be configured to perform this operation based on some incremental amount of volume.

Accordingly, the treatment control module then invokes the DMNAR module in Operation 1255 to determine the minimum number of agents required to be assigned to the upper sub-queue to meet the service level requirement set for the sub-queue and support stability based on the percentage of communication volume now assigned to the upper sub-queue to handle. The treatment control module then repeats Operations 1240-1255 until the average wait time for the lower sub-queue is less than the upper and limit.

The treatment control module determines whether the average wait time for communications to be placed in the lower sub-queue is below the lower limit set for the lower sub-queue in Operation 1260. If this is the case, then the lower sub-queue may be overstaffed. Therefore, if the treatment control module determines this is the case, then the module reassigns agents by moving some of the agents assigned to the lower sub-queue to the upper sub-queue in Operation 1265. Again, depending on the embodiment, the treatment control module may be configured to move the agents based on some set criteria such as, for example, the amount of agents to move is based on the difference between the average wait time and the lower limit. The larger the difference, the more agents are moved. The treatment control module repeats Operations 1260 and 1265 until the average wait time for the lower sub-queue is not below the lower limit. At that point, the treatment control module sets the value ranges for the two sub-queues based on the percentages of communication volume set for each sub-queue in Operation 1270 and the process is completed.

Returning now to Operation 1225, if instead the treatment control module determines the maximum percentage of communication volume that can be handled by the upper sub-queue is not less than the target percentage for the upper sub-queue, then the module determines whether the two percentages are equal in Operation 1275. Here, if the two percentages are equal, then the same process flow is used as when the maximum percentage of communication volume the upper sub-queue can handle is less than the target percentage of communication volume for the upper sub-queue except a warning message is not sent to personnel.

At this point, if neither one of the determinations in Operations 1225 and 1275 is true, then the treatment control module assigns the target percentage of communication volume to the upper sub-queue and the remainder of the communication volume to the lower sub-queue in Operation 1280. The treatment control module then invokes the DMNAR module to determine the minimum number of agents required to be assigned to the upper sub-queue to meet the service level requirement set for the sub-queue and support stability based on the target percentage of communication volume for the upper sub-queue in Operation 1285.

The treatment control module then performs Operations 1240-1265 until the average wait time for the lower sub-queue is in between the upper and lower limits. At that point, the treatment control module sets the value ranges for the two sub-queues based on the percentages of communication volume set for each sub-queue in Operation 1270 and the process is completed.

Returning now to FIG. 11, a determination may be made several times during a workday that a sub-queue should be added to a treatment or removed from a treatment. For instance, the communication handling module may be monitoring the average wait time for communications placed in the lowest value sub-level for a treatment and determine that the average wait time is higher than a threshold value, resulting in a trigger event indicating the number of sub-queues for the treatment needs to be reduced. Similarly, the communication handling module may determine the total number of surplus agents for a treatment is as large as the number of agents needed by the next-to-lowest value sub-queue to maintain stability, resulting in a trigger event indicating the number of sub-queues for the treatment needs to be increased.

Therefore, if the treatment control module determines a treatment is not being started up in Operation 1120, then the treatment control module determines whether a trigger event has occurred that requires the removal of a sub-queue from the treatment in Operation 1125. If so, then the treatment control module updates the number of sub-queues for the treatment to remove a sub-queue in Operation 1130. If the trigger event does not indicate a sub-queue should be removed from the treatment, then the trigger event must indicate a sub-queue should be added to the treatment. Therefore, the treatment control module updates the number of sub-queues for the treatment to add a sub-queue in Operation 1135. At this point, the treatment control module in various embodiments places the treatment in an update mode and executes the process flow in FIG. 13.

Turning now to FIG. 13, the agents assigned to the lowest value sub-queue in the current configuration of the treatment will remain assigned to this sub-queue in the updated configuration of the treatment, while all other agents may be assigned to new sub-queues. In addition, the target percentage of communication volume and service level requirement assigned to the highest value sub-queue in the current configuration of the treatment will remain assigned to the highest value sub-queue in the updated configuration of the treatment. Likewise, the target percentage of communication volume and service level requirement assigned to the next-to-lowest value sub-queue in the current configuration of the treatment will remain assigned to the next-to-lowest value sub-queue in the updated configuration of the treatment.

Accordingly, the treatment control module first sets a target percentage of communication volume for each of the intermediate sub-queues that lie between the highest value sub-queue and the next-to-lowest value sub-queue in Operation 1310. In various embodiments, the treatment control module executes this particular operation by interpolating the target percentages of communication volume for each of the intermediate sub-queues based on the target percentages of communication volume assigned to the highest value and next-to-lowest sub-queues. At this point, the treatment control module makes moderate adjustments around the target percentages of communication volume for the sub-queues to achieve some type of secondary objective in Operation 1315.

For instance, in particular embodiments, the secondary objective may be to minimize a modified form of the abandonment rate of the total treatment. As you may recall, the abandonment rate for a treatment is determined by dividing the number of abandoned communications in a set of communications that were assigned the treatment by the total number of communications in the set of communications. Here, a penalty is assigned to each abandoned communication and this penalty is less for lower value communications than for higher value communications since the loss of a lower value communication has less business impact than the loss of a higher value communication.

In particular embodiments, the treatment control module may be configured to use a sliding scale penalty made up of a sequence of cost scale factors that is extended as the number of sub-queues increases. For example, when a treatment is made up of only two sub-queues, the cost scale factor for an abandoned communication for the lower value sub-queue may be one and the cost scale factor for an abandoned communication for the higher value sub-queue may be a constant F1 such as two. In other words, in this example, when F1 equals two, an abandoned communication from the upper value sub-queue is twice as costly as an abandoned communication from the lower value sub-queue.

If there are three sub-queues then F1 defines the increased cost of an abandonment for the middle value sub-queue compared to the lower sub-queue. A new cost scale factor F2 is then used to define the increased cost of an abandonment for the upper value sub-queue compared to the middle value sub-queue, where F2 is between one and F1. This sequence of cost scale factors is extended in a similar way as the number of sub-queues increases. For example, in one particular instance, the sequence of cost scale factors may be generated by taking the square root of the preceding factor in the sequence, other than F1. While in another instance, the sequence of cost scale factors may be generated by taking a value half way between one and the preceding factor, other than F1. Accordingly, the treatment control module makes moderate adjustments of the percentages of communication volume set for the sub-queues until the modified abandonment rate has been minimized based on the outcomes of the communications found in the set of communications that were assigned the treatment (e.g., based on whether the communications were processed and handled by an agent or abandoned).

Another example of a secondary objective that may be used in various embodiments is to maximize the value capture rate of the treatment instead of minimizing a modified abandonment rate. This particular secondary objective can be used when the values of communications lie on a linear numeric scale and because the value of a single communication continuously increases in progressing from the lowest value sub-queue to the highest value sub-queue, cost scale factors are no longer needed. Therefore, the over-all value capture rate for the treatment can be computed in a standard way. For instance, you may recall, the value capture rate for the treatment can be determined as a ratio of the sum of communication values of the communications in a set of communications that were assigned the treatment and were connected with an agent to the sum of communication values of all the communications in the set of communications that were assigned the treatment. Accordingly, in various embodiments, the use of this secondary objective rather than minimizing a modified abandonment rate is marginally less computationally demanding and is a more natural process with fewer tuning requirements.

Once the treatment control module has adjusted the percentages of communication volume for the sub-queues, the module determines the value range for each of the sub-queues based on the adjusted percentages of communication volume and communication values found in the communication value distribution in Operation 1320. Next, the treatment control module sets the service level requirements for the intermediate sub-queues in Operation 1325. Again, in various embodiments the service level requirements for the highest value sub-queue and the next-to-lowest value sub-queue are defined (set) and the treatment control module executes this particular operation by interpolating service level requirements for each of the intermediate sub-queues that lie between the highest value sub-queue and the next-to-lowest value sub-queue based on the service level requirements assigned to these two sub-queues.

At this point, the treatment control module selects a sub-queue in Operation 1330. Similar to the other configuration of the treatment control module, the treatment control module in this configuration initially selects the highest value sub-queue for the treatment and then subsequently, selects the next highest value sub-queue, and so forth, until the module finally selects the next-to-lowest value sub-queue for the treatment. (Recall that the lowest value sub-queue retains the agents already assigned to the sub-queue in the current configuration of the treatment.) Upon selecting a sub-queue, the treatment control module invokes the DMNAR module to determine the minimum number of agents required to be assigned to the sub-queue to meet the service level requirement set for the selected sub-queue and support stability in Operation 1335.

Next, the treatment control module determines whether the selected sub-queue is the next-to-lowest value sub-queue for the treatment in Operation 1340. If not, then the treatment control module assigns agents to the selected sub-queue based on the minimum number of agents required to be assigned to the sub-queue in Operation 1345. Again, as previously discussed, in various embodiments, each agent who is available to handle communications for the treatment is given a ranking value and this ranking value is used in staffing the various sub-queues for the treatment. Once the treatment control module has assigned the appropriate agents to the particular sub-queue, the module returns to Operation 1330 to select the next sub-queue for the treatment.

Returning to Operation 1340, if the treatment control module determines instead the selected sub-queue is the next-to-lowest value sub-queue, then the module determines whether the remaining agents who are available to handle communications for the treatment is greater than the minimum number of agent required to be assigned to the sub-queue in Operation 1350. If so, then the treatment control module assigns the remaining agents to the next-to-lowest value sub-queue in Operation 1360. At this point, the process ends and the new configuration for the treatment is then used to handle communications assigned to the treatment. However, if the number of remaining agents is not greater than the minimum number needed, then the treatment control module updates the number of sub-queues for the treatment to remove a sub-queue in Operation 1355. At this point, the treatment control module repeats the process flow shown in FIG. 14 based on the updated number of sub-queues.

Therefore, if a trigger event occurs in various embodiments that signals a sub-queue should be added to the treatment, the treatment control module executes the process flow shown in FIG. 13 and one of two outcomes occur. Firstly, the treatment control module may determine the treatment can support an additional sub-queue and as a result, the treatment control module derives a new configuration of the treatment that includes an additional sub-queue. Or secondly, the treatment control module may determine the treatment cannot support an additional sub-queue and as a result in particular embodiments, the treatment control module then removes the additional sub-queue from the treatment and again executes the process flow shown in FIG. 13 to revert the treatment back to its current configuration. While in other embodiments, the treatment control module does not repeat the process flow shown in FIG. 13 but instead, simply ends without invoking a new configuration of the treatment and the current configuration of the treatment remains in effect.

In similar fashion, if a trigger event occurs in various embodiments that signals a sub-queue should be removed from the treatment, the treatment control module executes the process flow shown in FIG. 13 and one of two outcomes occur. Firstly, the treatment control module may determine the removal of a sub-queue from the treatment stabilizes the treatment and as a result, the treatment control module derives a new configuration of the treatment that has removed a sub-queue from the treatment. Or secondly, the treatment control module may determine the treatment requires removal of a further sub-queue from the treatment and as a result, the treatment control module removes an additional sub-queue from the treatment and again executes the process flow shown in FIG. 13 to determine whether the removal of an additional sub-queue stabilizes the treatment.

Finally, in various embodiments, the treatment is placed in a steady state mode once the treatment has been started up or the configuration of the treatment has been updated to add or remove one or more sub-queues. While in the steady state mode, if a surplus of agents in terms of meeting the needs of all the sub-queues is experienced, then in particular embodiments the percentages of communication volume for the sub-queues of the treatment may be fined tuned on an ongoing basis to achieve a secondary objective such as minimizing the modified abandonment rate. Only moderate divergences from the target percentages are typically allowed, however, and all adjustments to the percentages continue to provide the minimum number of agents required to support stability for all of the sub-queues.

The opposite situation may also arise where a deficiency is experienced in the number of agents to meet the needs of all the sub-queues while a treatment is in the steady state mode. When such a situation occurs in particular instances, agents may be supplied to the treatment by providing the agents required by the highest value sub-queue first, and then the second highest value sub-queue, and so forth until as some point, the agents may run out completely for one or more of the lower value sub-queues including the lowest value sub-queue, leaving those sub-queues empty of agents to support the sub-queues. However, such a dramatic shortfall typically only occurs when the treatment experiences a large scale event such as a huge upsurge in the arrival rate of communications assigned to the treatment. For example, a contact center may experience a sudden large volume of incoming calls that are to be assigned to a particular treatment as a result of a large number of remote parties responding to an infomercial.

A more common type of deficiency that is likely to occur is when there are not quite enough agents available to handle communications for the treatment to cover all of the sub-queues for the treatment due to a temporary random upsurge in the arrival rate of communications for the treatment or due to a loss of a moderate fraction of the agents available to handle communications for the treatment. In these cases, the same procedure of giving priority assignment of agents to the higher value sub-queues is followed in various embodiments, typically resulting in lowering the number of agents assigned to lower value sub-queues, sometimes to the point of zero. However, these types of deficiencies are typically short lived and the agent count for the lower sub-queues is restored to normal levels rather quickly.

A Third Configuration of the Treatment Control Module

Figure 14:
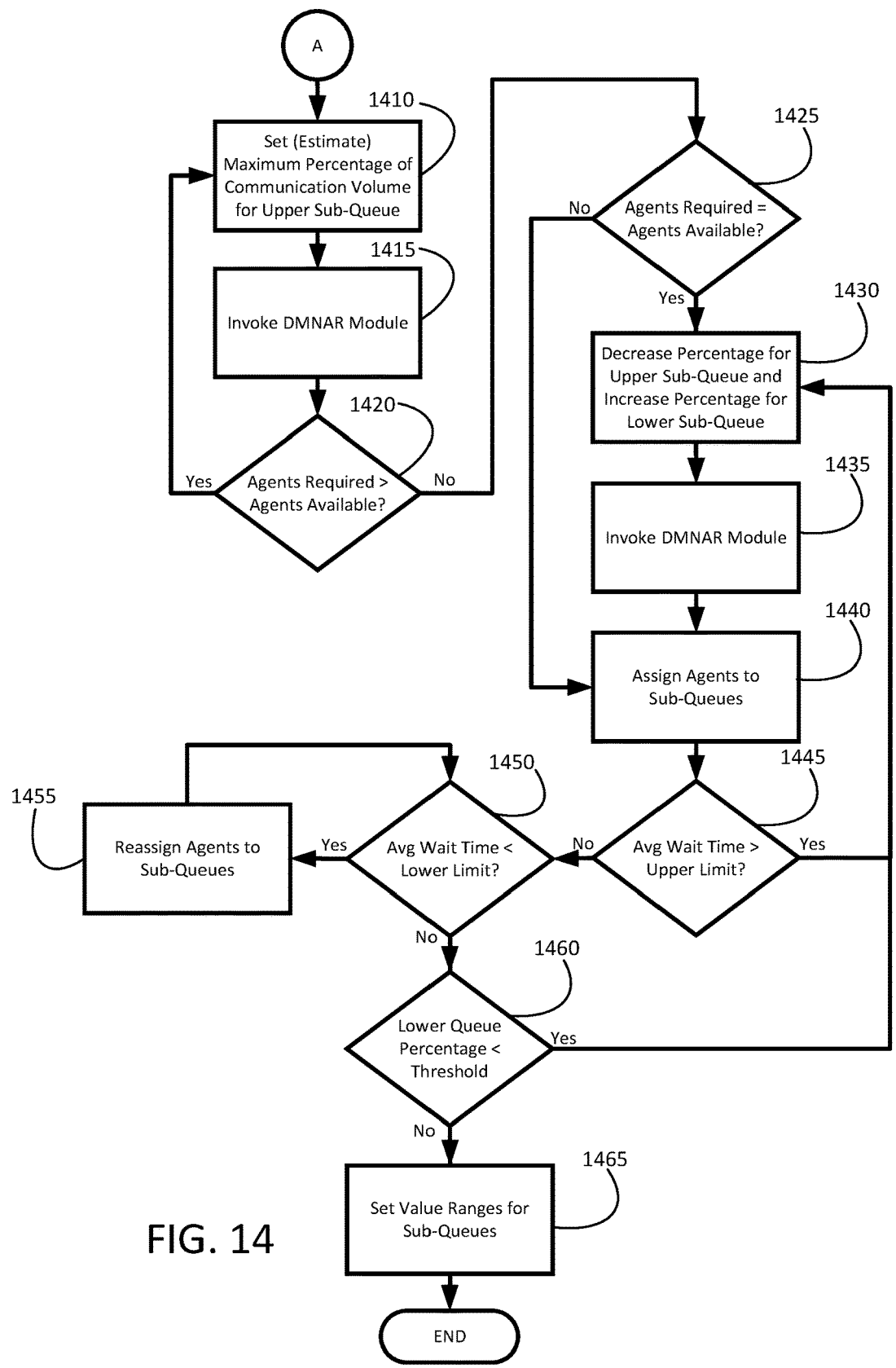
FIGS. 14-15 illustrate a third process flow for assigning the sub-queue value ranges and agents to the sub-queues for a treatment in accordance with various embodiments of the present invention.
Figure 15:
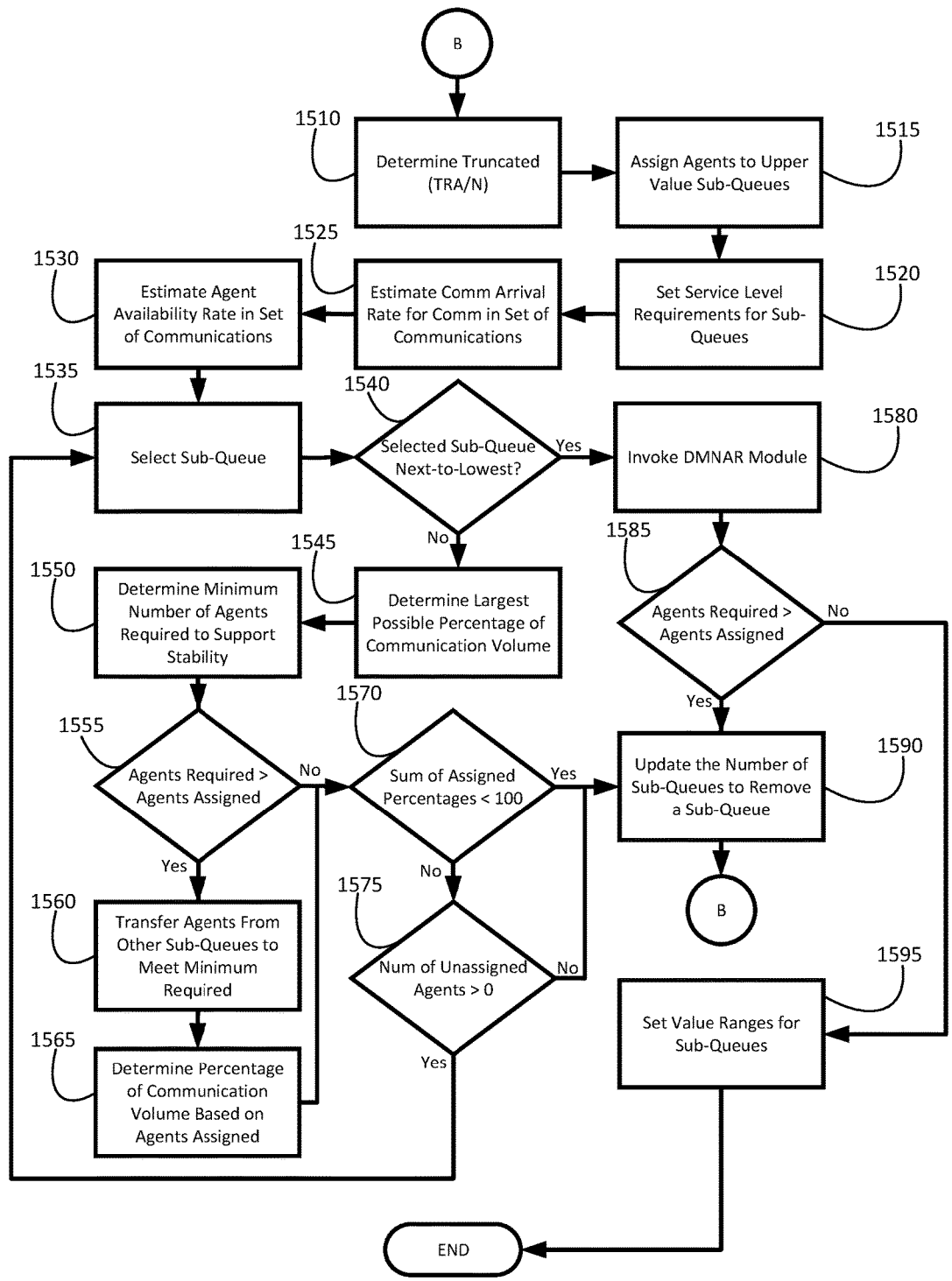

Finally, turning now to FIGS. 14-15, additional details are provided regarding another process flow for assigning the sub-queue value ranges and agents to the sub-queues for a treatment at startup or when some condition that can affect the performance of a treatment occurs according to various embodiments of the invention. In particular, the figure provides a flow diagram showing another configuration of the treatment control module for performing such functionality according to various embodiments of the invention.

Here, the process flow shown in FIGS. 14-15 is similar to the process flow shown in FIGS. 11-13 in that the portion of process flow shown in FIG. 11 is also performed in conjunction with the process flow shown in FIGS. 14-15. However, in this particular instance, the process flow shown in FIGS. 14-15 does not make use of target percentages of communication volume for any of the sub-queues of a treatment but instead, determines the percentages of communication volume to be handled by each sub-queue.

The reason for this is the use of target percentages for sub-queues can result in a disadvantage in that since the choice of a target percentage is essentially arbitrary, the wrong choice of a target percentage of communication volume for a sub-queue can artificially limit the number of sub-queues that can make up a treatment. For example, suppose that the target percentages for the highest value and next-to-lowest value sub-queues are set to 5% and 25%, respectfully, for a treatment. Here, the target percentages set for the intermediate sub-queues that lie between the highest value and next-to-lowest value sub-queues would be determined by interpolation between the target percentages set for these two sub-queues. So the average target percentages for the intermediate sub-queues would be 15%, with the sub-queues closer to the highest value sub-queue having lower percentages and the sub-queues closer to the next-to-lowest value sub-queue having higher percentages.

Accordingly, a maximum of four intermediate sub-queues can be used because using five sub-queues would cause the target percentages to add up to more than 100%. Therefore, it follows in this example that the maximum possible number of sub-queues is seven for this treatment. However, if the treatment is large in that the treatment has a high communication arrival rate and/or a large number of agents available to handle communications for the treatment, then limiting the number of sub-queues to seven may be unnecessary and prevent truly achieving the primary objective of maximizing the number of sub-queues for the treatment. The use of smaller starting target percentages could reduce this disadvantage to a large extent. However, the use of smaller starting target percentages would be inappropriate for a small treatment. Accordingly, the configuration of the treatment control module shown in FIGS. 14-15 eliminates the use of target percentages and may allow both the primary objective of maximizing the number of sub-queues for a treatment and a secondary objective such as maximizing total value capture rate for the treatment to be more fully achieved in an automated fashion.

Accordingly, turning now to FIG. 14, the portion of the process flow shown in this figure is executed by the treatment control module as a result of the module determining that a treatment is to be started up (similar to the startup mode portion of the process flow shown in FIG. 11). Here, gain, when a treatment is started up on a given day, the treatment is typically configured to have only two sub-queues upon startup. In addition, the upper sub-queue (the highest value sub-queue) of the treatment has a defined (set) service level requirement. However, a target percentage of communication volume is not used for the upper sub-queue. Further, a lower limit and upper limit are set for the average wait time communications can sit in the lower sub-queue.

The treatment control module begins this portion of the process flow by determining a maximum percentage of communication volume that can be assigned to the upper sub-queue. Here, the treatment control module determines the maximum percentage of communication as the percentage of communication volume that can be assigned to the upper sub-queue and still have enough agents to meet the upper sub-queue's service level requirement and support stability.

Accordingly, the treatment control module sets (estimates) the maximum percentage of communication volume for the upper sub-queue in Operation 1410. At a first pass, the treatment control module in various embodiments sets the maximum percentage of communication volume for the upper sub-queue to one-hundred percent and then subtracts an increment of the percentage each time the module determines the upper sub-queue cannot support the current amount set for the maximum percentage of communication volume for the upper sub-queue to handle.

The treatment control module then determines the minimum number of agents required to be assigned to the upper sub-queue by invoking the DMNAR module in Operation 1415, and the DMNAR module returns the required number of agents to the treatment control module. Here, the required number of agents identifies a minimum number of agents required to be assigned to the upper sub-queue to maintain the service level requirement set for the upper sub-queue and support stability at the maximum percentage of communication volume currently set for the sub-queue. If the required number of agents is greater than the number of agents available to handle communications for the treatment (pool of agents available to handle communications for the treatment) then the upper sub-queue cannot support the maximum percentage of communication volume currently set for the sub-queue.

Thus, in Operation 1420, if the treatment control module determines the required number of agents for the upper sub-queue at the current maximum percentage of communication volume is greater than the number of agents currently available to handle communications for the treatment, then the treatment control module returns to Operation 1410 and re-sets the maximum percentage of communication volume to be handled by the upper sub-queue to a smaller amount. For instance, in particular embodiments, the treatment control module may be configured to reduce the maximum percentage of communication volume by some incremental percentage, such as one, two, or five percent, and then performs Operations 1415 to 1420. Accordingly, the treatment control module repeats Operations 1415 to 1420 until the required number of agents for a particular maximum percentage of communication volume for the upper sub-queue to handle is equal to or less than the number of agents currently available to handle communications for the treatment.

Once the maximum percentage of communication volume that can be handled by the upper sub-queue has been identified, the treatment control module determines whether the number of agents required to be assigned to the upper sub-queue is equal to the number of agents available to handle communications for the treatment in Operation 1425. If the number of agents required to be assigned to the upper sub-queue is equal to the number of agents available to handle communications for the treatment, then the treatment control module decreases the percentage of communication volume to be handled by the upper sub-queue by some incremental amount and increases the percentage of communication volume to be handled by the lower sub-queue by the same incremental amount in Operation 1430. As a result, the number of agents required to be assigned to the upper sub-queue is lower to due to the lower volume of communications the upper sub-queue is now required to handle.

Accordingly, the treatment control module invokes the DMNAR module in Operation 1435 to determine the minimum number of agents now required to be assigned to the upper sub-queue as a result of lower the percentage of communication volume to be handled by the upper sub-queue. At this point, the treatment control module assigns agents to the two sub-queues based on the minimum number of agents required to be assigned to the upper sub-queue to meet its service level requirement and support stability in Operation 1440.

The treatment control module then determines the average wait time for communications placed in the lower sub-queue based on the percentage of communication volume the lower sub-queue is to handle and determines whether the average wait time is greater than the upper limit in Operation 1445. If so, then the treatment control module repeats Operations 1430-1440 until the average wait time is not greater than the upper limit.

If the average wait is not greater than the upper limit, then the treatment control module determines whether the average wait time for communications to be placed in the lower sub-queue is below the lower limit set for the lower sub-queue in Operation 1450. If the treatment control module determines this is the case, then the module reassigns agents by moving some of the agents assigned to the lower sub-queue to the upper sub-queue in Operation 1455. Again, depending on the embodiment, the treatment control module may be configured to move the agents based on some set criteria such as, for example, the amount of agents to move is based on the difference between the average wait time and the lower limit. The larger the difference, the more agents are moved. The treatment control module repeats Operations 1450 and 1555 until the average wait time for the lower sub-queue is not below the lower limit.

At this point, the treatment control module then determines whether the percentage of communication volume assigned to the lower sub-queue to handle is above some threshold amount in Operation 1460. For instance, in particular embodiments, the contact center may establish that at least ten percent of the communication volume must be handled by the lower sub-queue and accordingly, the treatment control module in Operation 1460 determines whether the percentage of communication volume assigned to the lower sub-queue is lower than ten percent. If so, then the treatment control module again repeats Operations 1430-1455 until the percentage of communication volume is over the threshold. At that point, the treatment control module sets the value ranges for the two sub-queues based on the percentage of communication volume assigned to each sub-queue and the communication value distribution of the treatment in Operation 1465.

Continuing on with FIG. 15, this portion of the process flow is executed by the treatment control module when a trigger event occurs indicating the current configuration of a treatment should be altered by adding or removing a sub-queue from the treatment. Here, again, the agents assigned to the lowest value sub-queue in the current configuration of the treatment will remain assigned to this sub-queue in the updated configuration of the treatment, while all other agents may be assigned to new sub-queues. In addition, the service level requirement assigned to the highest value sub-queue in the current configuration of the treatment will remain assigned to the highest value sub-queue in the updated configuration of the treatment. Further, the service level requirement assigned to the next-to-lowest value sub-queue in the current configuration of the treatment will remain assigned to the next-to-lowest value sub-queue in the updated configuration of the treatment.

Furthermore, the percentage of communication volume and the number of agents assigned to the lowest value sub-queue in the current configuration will remain assigned to the lowest value sub-queue in the updated configuration of the treatment. For convenience of reference the difference between the total number of agents available to handle communications for the treatment and the number of agents assigned to the lowest value sub-queue is called the total residual number of agents ("TRA"). Likewise, the residual percentage of communication volume remaining after the lowest sub-queue's percentage of communication volume is subtracted from 100% is called the total available percentage of communication volume ("TAP").

Accordingly, the treatment control module starts off the update mode process by determining a truncated ratio of the TRA over the number of sub-queues, excluding the lowest value sub-queue, for the treatment to the nearest integer in Operation 1510. The treatment control module then assigns this number of agents to the upper sub-queues of the treatment, excluding the lowest sub-queue, in Operation 1515.

For example, a trigger may have occurred indicating that a sub-queue should be added to a treatment with a current configuration having two sub-queues. Here, the treatment may have fifty-two agents available to handle communications for the treatment and ten of those agents are currently assigned to the lower sub-queue. Therefore, the treatment control module determines the truncated ratio is twenty-one (TRA=52−10 or 42, and the number of sub-queues, excluding the lowest value sub-queue, is 2, therefore 42/2=21) and assigns twenty-one agents each to the highest value sub-queue and the middle value sub-queue. Had the number of agents available been fifty-three agents instead of fifty-two, then the treatment control module is configured in particular embodiments to assign the remainder represented as an additional agent to the highest value sub-queue. Thus, in this example, the treatment control module would have assigned twenty-two agents to the highest value sub-queue and twenty-one agents to the middle value sub-queue.

Next, the treatment control module sets the service level requirements for the sub-queues in Operation 1520. Here, in particular embodiments, the highest value sub-queue and next-to-lowest value sub-queue are assigned service level requirements and the treatment control module interpolates the service level requirements for any sub-queues that lie between these two sub-queues. The treatment control module then estimates the arrival rate of communications for the treatment based on the communications found in the set of communications for the treatment in Operation 1525. Likewise, the treatment control estimates the agent availability rate for the treatment based on the communications found in the set of communications for the treatment in Operation 1530.

At this point, the treatment control module selects a sub-queue in Operation 1535. Again, similar to the other configurations of the treatment control module, the module in this instance selects the highest value sub-queue first and then subsequent sub-queues until the next-to-lowest value sub-queue. Therefore, in Operation 1540, the treatment control module determines whether the selected sub-queue is the next-to-lowest value sub-queue. If not, then the treatment control module determines the largest possible percentage of communication volume that can be assigned to the sub-queue and still have the sub-queue meet its service level requirement and based on the number of agents assigned to the sub-queue in Operation 1545. In addition, the treatment control module determines the minimum number of agents required for the sub-queue to support stability in Operation 1550.

Next, the treatment control module determines whether the minimum number of agents required to support stability is greater than the number of agents currently assigned to the sub-queue in Operation 1555. If so, then the treatment control module transfers agents from the sub-queues that lie below the currently selected sub-queue, besides the lowest value sub-queue, to the currently selected sub-queue in Operation 1560. For example, the treatment may be configured to include four sub-queues and the currently selected sub-queue may be the highest value sub-queue. Therefore, if the minimum number of agents required to be assigned to the currently selected sub-queue is twelve agents and only ten agents are currently assigned to the sub-queue, then the treatment control module in particular embodiments would transfer one agent each from the two middle value sub-queues of the treatment to the highest value sub-queue.

The treatment control module would then determine the percentage of communication volume the currently selected sub-queue can handle based on the number of agents now assigned to the sub-queue in Operation 1565. This determined percentage is then assigned to the currently selected sub-queue along with the agents assigned to the treatment. At this point, the treatment control module then determines whether the sum of assigned percentages of communication volume for the sub-queues that have been processed and the lowest value sub-queue is greater than one-hundred percent in Operation 1570. For instance, returning to the example, if the treatment control module is processing the next-to-highest value sub-queue after processing the highest value sub-queue and the percentage of communication volume assigned to the next-to-highest value sub-queue is twenty-three percent, the percentage of communication volume assigned to the highest value sub-queue is twenty percent, and the percentage of communication volume assigned to the lowest value sub-queue is thirty percent, then the treatment control module would determine the sum of the assigned percentages (20%+23%+30%=73%) is not over one-hundred percent.

Accordingly, the treatment control module would then determine whether the number of "unassigned" agents for the remaining sub-queues that have not been processed is greater than zero in Operation 1575. Again, returning to the example, if the treatment has a total of eighty agents available to handle communication for the treatment and the number of agents assigned to the highest value sub-queue is twenty agents, the number of agents assigned to the next-to-highest value sub-queue is seventeen agents, and the number of agents assigned to the lowest value sub-queue is five agents, then the treatment control module would determine that the number of "unassigned" agents for the remaining sub-queues (80−20−17−5=38) is greater than zero. If the number of "unassigned" agents is still positive, then the treatment control module returns to Operation 1535 and selects the next sub-queue for the treatment, However, if the sum of the assigned percentages of communication volume is not less than one-hundred percent or the number of "unassigned" agents is not positive, then the treatment is unable to support the number of sub-queues currently set for treatment. Therefore, in these instances, the treatment control module updates the number of sub-queues for the treatment to remove a sub-queue in Operation 1590. At that point, in particular embodiments, the treatment control module repeats the process flow shown in FIG. 15 for the treatment using the reduced number of sub-queues. While other embodiments, the treatment control module may instead just end without updating the treatment configuration and instead leave the current configuration of the treatment active. For example, if a trigger event occurred indicating a sub-queue should be added to the treatment. However, the treatment control module determines the treatment is unable to support an additional sub-queue, the treatment control module may just end at that point and the current configuration of the treatment without the additional sub-queue may stay in affect.

Finally, returning to Operation 1540, if the treatment control module determines the currently selected sub-queue is the next-to-lowest value sub-queue for the treatment, then the module invokes the DMNAR module in various embodiments to determine the minimum number of agents required to be assigned to the next-to-lowest value sub-queue so that the sub-queue can meet its service level requirement and support stability in Operation 1580. The treatment control module then determines whether the required number of agents is greater than the number of agents that are left assigned to the next-to-lowest value sub-queue in Operation 1585. If so, then again the treatment cannot support the number of sub-queues and a sub-queue is removed from the treatment in Operation 1590. However, if the number of agents required for the next-to-lowest value sub-queue is not greater than the number of agents left to assign to the sub-queue, then the treatment control module sets the value ranges for each of the sub-queues in Operation 1595 based on the percentage of communication volume assigned to the sub-queue and the communication values found in the communication value distribution for the treatment. At that point, the new configuration of the treatment is put into effect and communications then processed according to the treatment are assigned to a sub-queue of the treatment based on the new configuration. At this point, the treatment is placed in a steady state mode in various embodiments.

Defining Treatments to Handle Both Inbound and Outbound Communications

As discussed herein, various embodiments of the invention may be used in conjunction with handling both inbound and outbound communications. With that said, particular embodiments of the invention are contemplated that make use of a single treatment that may be applied to both inbound and outbound communications.

For instance, a contact center actively seeking to communication with a given party (e.g., placing an outbound communication to a given party) to pursue the application of a particular treatment implies that the outbound communication to the party has a relatively high communication value. In addition, a contact center normally expects to hand off an outbound communication to an agent as soon as a connection is established with a party on the communication. Therefore, particular embodiments of the invention involve assigning outbound communications that have reached a party with a high value so that they are placed in an appropriate high value sub-queue of the applicable treatment to wait for an agent. Since high value sub-queues normally have short wait times (normally have stringent service level requirements), any hold time experienced by a party on an outbound communication should be negligible in most cases. As for inbound communications assigned to the treatment, these communications can be handled by determining a value of the communication and assigning them to the appropriate sub-queues accordingly.

Therefore, in various embodiments, once a communication has been placed in a sub-queue for a treatment configured to applied to both inbound and outbound communications, the communication is treated the same whether the communication is inbound or outbound. That is to say, the communication is forwarded to an agent to handle once the communication has reached the appropriate position in the sub-queue and an agent becomes available regardless of whether the communication is an inbound or outbound communication.

In addition, the various parameters computed for performing the treatment control process (such as the communication arrival rate) will automatically reflect the presence of both inbound and outbound communications. For instance, the assigning of agents to sub-queues as a matter of course is performed to accommodate a larger communication volume (higher communication arrival rate) for the appropriate high value range sub-queue that results from adding the outbound communications.

Application to Multi-Tasking Agents

A multi-tasking agent is an agent that handles two or more communications concurrently that may be over a single channel of communication or may span multiple channels of communication. Accordingly, various embodiments of the invention are configured to handle multi-tasking agents by making use of virtual agents. For instance, an agent assigned to handle two communications concurrently (e.g., one inbound email and one inbound chat) is treated as two virtual agents.

Thus, in particular embodiments, a given treatment may be divided up into separate sub-treatments for each applicable channel of communication with each separate sub-treatment having the same treatment goal(s), sub-queues, and value ranges as the given treatment. Here, each sub-treatment, that is, each combination of a single channel of communication and a given treatment, has its own separate stream of communications administered using the single channel of communication and pool of virtual agents that represent fractional assignments of human agents to the stream of communications that are to be applied the given treatment.

In addition, each sub-treatment of a given treatment (each channel-specific version of a given treatment) is managed independently. For example, if three channels of communication can be used for a given treatment, then the given treatment is handled in various embodiments as three independently managed channel-specific sub-treatments. In addition, the pools of virtual agents for the channel-specific sub-treatments may be more dynamically and volatilely constituted (populated), particularly if agents are allowed to be assigned concurrent communications from two or more different channels for a given treatment. Furthermore, the treatment control process can be used to effectively manage the individual sub-treatments.

Finally, depending on the embodiment, the agent ranking for a given treatment can be used for each of the individual sub-treatments or can be defined separately for each sub-treatment at the virtual agent level. For instance, an agent who is allowed to handle both calls and Web chats for a particular treatment may be very effective on calls but less effective on chats, due to the different skill sets required to handle the two different channels of communication. For example, a chat generally requires fast typing, the ability to write logic and grammatically correct sentences, and the ability to avoid confusing spelling errors for an agent to perform at a high level. Therefore, this agent who is deficient in chat-specific skills may be assigned a lower virtual agent ranking for chat than for voice.

Application to Generalized Agents

Artificial intelligence (AI) agents may find increasing application in contact center in the future, augmenting the use of or replacing human agents in some cases. Like human agents, AI agents require training and become more effective with increased experience in handling various communications. Here, one may think the best approach to using AI agents is to simply train one IA agent extensively in a treatment and then use cloned copies of that AI agent to handle all the communications in which the treatment is applied. However, such an approach may not amount to the best use of AI in particular instances. Instead, particular embodiments of the invention are contemplated using a steady stream of new untrained AI agents who gradually become trained based on their individual experiences in handling communications. Such an approach can be more effective in adapting to evolving business conditions and customer behavior, and can also accommodate new upgrades to the computational formulation of such agents as those become available.

Furthermore, various embodiments of the invention are contemplated that make use of AI agents that are assigned to the lowest value sub-queue, possibly mixing them in with human agents. The human agents would gradually rise to being assigned to higher value sub-queues as they become more experienced, but the AI agents may remain assigned to the lowest value sub-queue and continue to train there. In particular instances, a configuration may be implemented that allows the most effective AI agents to be cloned to assist in the event of a surge in communications resulting in a greater volume of communications being assigned to the lowest value sub-queue.

Advantages Realized in Various Embodiments of the Invention

Various embodiments of the invention provide significant advantages over conventional approaches to handling communications. For instance, particular embodiments of the invention provide for some degree of agent staff reduction with less service impact, since any staff reduction normally only impacts wait times for the lowest value sub-queue of any given treatment. For instance, a contact center may encounter a situation in which more agents are needed to adequately handle the volume of communications the contact center is experiencing. However, the contact center may not have yet hired any new agents to fulfill that need. Here, various embodiments of the invention can minimize the adverse effects of the staffing shortfall until staffing goals can be reached since any staffing shortfall normally only impacts wait times for the lowest value sub-queue. Conventional approaches do not have such an advantage.

In addition, various embodiments of the invention create an environment that helps to minimize the impact of communication handling mistakes made by new agents in training, since those agents are typically assigned to the lowest value sub-queue of the treatment, and thus to the lessor valued communications. Furthermore, agents assigned to the lowest value sub-queue are normally saturated with communications, never idle, and therefore are not normally assigned to cover another treatment on a temporary basis until they move up in the rankings in their primary treatment. Such practice provides a grace period for new agents to be cross-trained for other treatments without working those treatments on an exception basis until their general communication handling experience level is higher. Conventional approaches, such as using a single priority queue based on communication value, do not provide such advantages.

Further, various embodiments of the invention enable more valued customers, or customers who are more valued for a particular communication and the specific treatment selected for that communication, to be provided with a lower wait time and enhanced service experience commiserate with their assessed value. Conventional approaches, such as using a single priority queue based on communication value, provide the lower wait time but not the enhanced service experience.

Finally, various embodiments of the invention have some additional advantages over the use of a single priority queueing approach per treatment. For example, although various embodiments of the invention require the simultaneous management of several sub-queues for each treatment, each of those sub-queues is in general, a simple queue (e.g., a simple FIFO queue) that is straightforward to manage, and in many instances is handled in a more or less hands-off manner. In contrast, a conventional priority queueing approach requires design and tuning of a specialized queue control algorithm that is more difficult to guarantee the reliability of over a wide range of operational conditions.

In addition, several problems that arise in handling individual communications with a single priority queueing approach can be avoided by using various embodiments of the invention. For example, a single priority queueing approach typically includes disposing of all communications whose value falls below a time-varying cutoff value by routing those communications out via an automated communication system (like an IVR) and not placing them into a queue to wait for an agent. The intention for all of the communications selected for placement in a treatment's single priority queue is to have them reach an agent to be handled. However, it is possible for a given low value communication to sit in the priority queue indefinitely, because higher value communications keep arriving in the queue and preventing the low value communication from being forwarded to an agent. Therefore, in many instances, the priority queue control algorithm must have special modifications to keep communications from being stuck in the queue for an extensive period of time.

However, various embodiments of the invention do not require any special case modifications of queue management. Specifically, in particular embodiments, extended wait times are anticipated in the lowest value sub-queue before they occur, and long wait time warnings can be provided to the parties involved with those communications in the sub-queue before those waits are experienced, allowing the parties to make an informed decision to continue waiting, or to abandon their communications and contact the contact center at a later time.

Exemplary Processing Device Architecture

Figure 16:
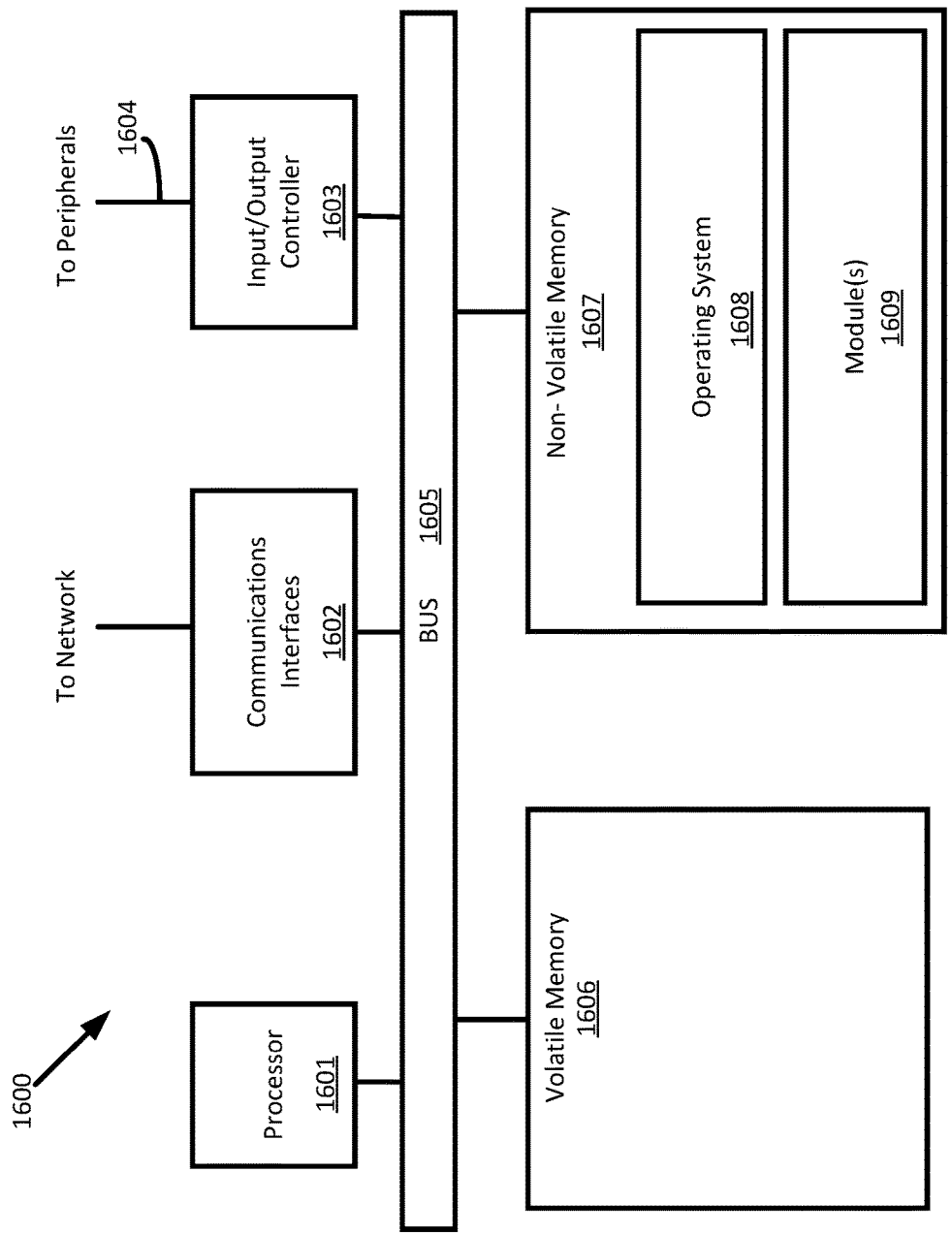
FIG. 16 is an exemplary schematic diagram of a processing component used in various embodiments of the contact center architecture to practice the technologies disclosed herein.

As discussed in conjunction with FIG. 1, the contact center architecture 100 may comprise various components. Accordingly, FIG. 16 is an exemplary schematic diagram of a processing component 1600 that may be used in various embodiments of the contact center architecture 100 to practice the technologies disclosed herein such as, for example, the communications handler 150, the email server 135, the text gateway server 140, the web server 145, and/or an agent's computing device 160a-160c. In general, the term "processing component" may be exemplified by, for example, but without limitation: various types of computers, servers, blades, gateways, switches, and the like, as well as any combination of devices or entities adapted to perform the functions described herein.

As shown in FIG. 16, the processing component 1600 may include one or more processors 1601 that may communicate with other elements within the processing component 1600 via a bus 1605. The processor 1601 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing component 1600 may also include one or more communication interfaces 1602 for communicating data via the local network with various external devices, such as other components of FIG. 1. Depending on the embodiment, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The processing component 1600 may further include an input/output controller 1603 that may communicate with one or more input devices or peripherals using an interface 1604, such as, but not limited to: a keyboard, a mouse, a touch screen/display input, microphone, pointing device, etc. The input/output controller 1603 may also communicate with output devices or peripherals, such as displays, printers, speakers, headsets, banner displays, etc.

The processor 1601 may be configured to execute instructions stored in volatile memory 1606, non-volatile memory 1607, or other forms of computer-readable storage media accessible to the processor 1601. The volatile memory 1606 may comprise various types of memory technologies, including, but not limited to: random access memory ("RAM"), dynamic random access memory ("DRAM"), static random access memory ("SRAM"), and other forms well known to those skilled in the art. The non-volatile memory 1607 may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 1607 may store program code and data, which also may be loaded into the volatile memory 1606 at execution time. Specifically, the non-volatile memory 1607 may store one or more program modules 1609, such as the various modules described above containing instructions for performing the processes and/or functions associated with the technologies disclosed herein, and/or operating system code 1608. In addition, these program modules 1609 may also access, generate, or store data 1610, in the non-volatile memory 1607, as well as in the volatile memory 1606. The volatile memory 1606 and/or non-volatile memory 1607 may be used to store other information including, but not limited to: records, applications, programs, scripts, source code, object code, byte code, compiled code, interpreted code, machine code, executable instructions, or the like. These may be executed or processed by, for example, the processor 1601 and/or may form a part of, or may interact with, the program modules 1609.

The technologies described herein may be implemented in various ways, including as computer program products comprising memory storing instructions causing a processor to perform the operations associated with the above technologies. The computer program product may comprise a tangible non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified media (including volatile and non-volatile media), but does not include a transitory, propagating signal. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer-readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method for routing a communication in a contact center comprising:
   selecting a treatment for the communication by a computer processor from a plurality of treatments supported by the contact center, in which each treatment in the plurality of treatments is applicable to at least one of a reason and an opportunity for conducting a communication with a remote party and comprises a set of sub-queues, each sub-queue in the set of sub-queues comprising a value range and a plurality of agents assigned to handle communications placed in the sub-queue, and at least one sub-queue in the set of sub-queues comprises a service level requirement identifying a level of service that is to be maintained by the plurality of agents assigned to handle the communications placed in the at least one sub-queue;
   determining a communication value for the communication by the computer processor based on a computation that is specific to the selected treatment;
   selecting a sub-queue from the set of sub-queues for the selected treatment by the computer processor based on the communication value falling within the value range for the sub-queue;
   placing the communication in the selected sub-queue so that the communication is connected to an agent of the plurality of agents assigned to handle the communications placed in the sub-queue; and
   upon the agent becoming available to handle the communication, connecting the communication with the agent.

2. The method of claim 1, wherein the value range for each sub-queue of the set of sub-queues for the selected treatment is sequentially positioned to the value range for another sub-queue of the set of sub-queues for the selected treatment.

3. The method of claim 1 further comprising assigning the value range for the at least one sub-queue based on an empirical communication value distribution derived from communication values for a set of communications that was applied the selected treatment and a percentage of communication volume to be handled by the at least one sub-queue.

4. The method of claim 3 further comprising replacing an oldest communication found in the set of communications with a new communication that was applied the selected treatment in response to the new communication being applied the selected treatment.

5. The method of claim 1, wherein the service level requirement for the at least one sub-queue comprises a number of communications or a percentage of communications that remain in the at least one sub-queue for no longer than a pre-defined length of time.

6. The method of claim 1 further comprising assigning the plurality of agents to the at least one sub-queue based on a ranking of each agent in the plurality of agents with respect to the selected treatment and the service level requirement for the at least one sub-queue.

7. The method of claim 1 further comprising re-establishing at least one of the set of sub-queues, the value range for each sub-queue in the set of sub-queues, and the plurality of agents assigned to handle communications placed in each sub-queue in the set of sub-queues in response to a change in a current condition of the contact center that affects a performance of the selected treatment.

8. A non-transitory, computer-readable medium comprising computer-executable instructions for routing a communication in a contact center, that when executed, cause at least one computer processor to:
select a treatment for the communication from a plurality of treatments supported by the contact center, in which each treatment in the plurality of treatments is applicable to at least one of a reason and an opportunity for conducting a communication with a remote party and comprises a set of sub-queues, each sub-queue in the set of sub-queues comprising a value range and a plurality of agents assigned to handle communications placed in the sub-queue, and at least one sub-queue in the set of sub-queues comprises a service level requirement identifying a level of service that is to be maintained by the plurality of agents assigned to handle the communications placed in the at least one sub-queue;
determine a communication value for the communication based on a computation that is specific to the selected treatment;
select a sub-queue from the set of sub-queues for the selected treatment based on the communication value falling within the value range for the sub-queue;
place the communication in the selected sub-queue so that the communication is connected to an agent of the plurality of agents assigned to handle the communications placed in the sub-queue upon the agent becoming available to handle the communication.

9. The non-transitory, computer-readable medium of claim 8, wherein the value range for each sub-queue of the set of sub-queues for the selected treatment is sequentially positioned to the value range for another sub-queue of the set of sub-queues for the selected treatment.

10. The non-transitory, computer-readable medium of claim 8, wherein the value range for the at least one sub-queue is assigned based on an empirical communication value distribution derived from communication values for a set of communications that was applied the selected treatment and a percentage of communication volume to be handled by the at least one sub-queue.

11. The non-transitory, computer-readable medium of claim 10, wherein an oldest communication found in the set of communications is replaced with a new communication that was applied the selected treatment in response to the new communication being applied the selected treatment.

12. The non-transitory, computer-readable medium of claim 8, wherein the service level requirement for the at least one sub-queue comprises a number of communications or a percentage of communications that remain in the at least one sub-queue for no longer than a pre-defined length of time.

13. The non-transitory, computer-readable medium of claim 8, wherein the plurality of agents is assigned to the at least one sub-queue based on a ranking of each agent in the plurality of agents with respect to the selected treatment and the service level requirement for the at least one sub-queue.

14. The non-transitory, computer-readable medium of claim 8, wherein at least one of the set of sub-queues, the value range for each sub-queue in the set of sub-queues, and the plurality of agents assigned to handle communications placed in each sub-queue in the set of sub-queues is re-established in response to a change in a current condition of the contact center that affects a performance of the selected treatment.

15. A system for routing a communication in a contact center comprising:
at least one computer processor configured to:
select a treatment for the communication from a plurality of treatments supported by the contact center, in which each treatment in the plurality of treatments is applicable to at least one of a reason and an opportunity for conducting a communication with a remote party and comprises a set of sub-queues, each sub-queue in the set of sub-queues comprising a value range and a plurality of agents assigned to handle communications placed in the sub-queue, and at least one sub-queue in the set of sub-queues comprises a service level requirement identifying a level of service that is to be maintained by the plurality of agents assigned to handle the communications placed in the at least one sub-queue;
determine a communication value for the communication based on a computation that is specific to the selected treatment;
select a sub-queue from the set of sub-queues for the selected treatment based on the communication value falling within the value range for the sub-queue;
place the communication in the selected sub-queue so that the communication is connected to an agent of the plurality of agents assigned to handle the communications placed in the sub-queue upon the agent becoming available to handle the communication.

16. The system of claim 15, wherein the value range for each sub-queue of the set of sub-queues for the selected treatment is sequentially positioned to the value range for another sub-queue of the set of sub-queues for the selected treatment.

17. The system of claim 15, wherein the value range for the at least one sub-queue is assigned based on an empirical communication value distribution derived from communication values for a set of communications that was applied the selected treatment and a percentage of communication volume to be handled by the at least one sub-queue.

18. The system of claim 17, wherein an oldest communication found in the set of communications is replaced with a new communication that was applied the selected treatment in response to the new communication being applied the selected treatment.

19. The system of claim 15, wherein the service level requirement for the at least one sub-queue comprises a number of communications or a percentage of communications that remain in the at least one sub-queue for no longer than a pre-defined length of time.

20. The system of claim 15, wherein the plurality of agents is assigned to the at least one sub-queue based on a ranking of each agent in the plurality of agents with respect to the selected treatment and the service level requirement for the at least one sub-queue.

21. The system medium of claim 15, wherein at least one of the set of sub-queues, the value range for each sub-queue in the set of sub-queues, and the plurality of agents assigned to handle communications placed in each sub-queue in the set of sub-queues is re-established in response to a change in a current condition of the contact center that affects a performance of the selected treatment.

* * * * *